US012770744B2

(12) United States Patent
Howard et al.

(10) Patent No.: US 12,770,744 B2
(45) Date of Patent: Oct. 20, 2026

(54) PLASMA COMPRESSION SYSTEM UTILIZING POLOIDAL FIELD COILS

(71) Applicant: GENERAL FUSION INC., Richmond (CA)

(72) Inventors: Stephen James Howard, Burnaby (CA); Meritt Wayne Reynolds, New Westminster (CA); Michel Laberge, West Vancouver (CA); Alexander Douglas Mossman, Vancouver (CA); David Plant, Vancouver (CA); Celso Ribeiro, Vancouver (CA)

(73) Assignee: General Fusion Inc., Richmond (CA)

( * ) Notice: Subject to any disclaimer, the term of this patent is extended or adjusted under 35 U.S.C. 154(b) by 211 days.

(21) Appl. No.: 18/844,363

(22) PCT Filed: Mar. 14, 2023

(86) PCT No.: PCT/CA2023/050331
§ 371 (c)(1),
(2) Date: Sep. 5, 2024

(87) PCT Pub. No.: WO2023/173210
PCT Pub. Date: Sep. 21, 2023

(65) Prior Publication Data

US 2025/0191790 A1 Jun. 12, 2025

Related U.S. Application Data

(60) Provisional application No. 63/269,309, filed on Mar. 14, 2022.

(51) Int. Cl.
*G21B 1/05* (2006.01)
*H05H 1/02* (2006.01)

(52) U.S. Cl.
CPC .................................... *G21B 1/05* (2013.01)

(58) Field of Classification Search
None
See application file for complete search history.

(56) References Cited

U.S. PATENT DOCUMENTS 3,523,206 A 8/1970 Drabier
3,668,067 A 6/1972 Christofilos
(Continued)

FOREIGN PATENT DOCUMENTS

CN 101496111 7/2009
CN 105185417 A 12/2015
(Continued)

OTHER PUBLICATIONS

International Search Report and Written Opinion in PCT/CA2021/051824 mailed on Feb. 4, 2022 in 7 pages.
(Continued)

*Primary Examiner* — Jany Richardson
(74) *Attorney, Agent, or Firm* — Knobbe, Martens, Olson & Bear, LLP

(57) ABSTRACT

Examples of a plasma compression system are disclosed. The system includes a metallic vessel configured to receive and contain a plasma. The system further includes a metallic liquid liner in the vessel and at least partially bounding a plasma compression region having a longitudinal axis, and means for moving the liquid liner inwardly towards the longitudinal axis to compress the plasma in the plasma compression region. The system further includes a plurality of electrically conductive coils outside the plasma compression region and configured to generate a poloidal magnetic field in the liquid liner and the plasma compression region. At least some of the poloidal magnetic field within the plasma compression region extends along the longitudinal axis, and at least some of the poloidal magnetic field in the liquid liner moves inwardly towards the longitudinal axis
(Continued)

with the liquid liner as the liquid liner moves towards the longitudinal axis.

31 Claims, 23 Drawing Sheets

(56) References Cited

U.S. PATENT DOCUMENTS

| | | | | |
|---|---|---|---|---|
| 4,140,057 | A | 2/1979 | Turchi et al. | |
| 4,158,598 | A | 6/1979 | Baird | |
| 4,217,171 | A | 8/1980 | Schaffer | |
| 4,233,537 | A | 11/1980 | Limpaecher | |
| 4,252,605 | A | 2/1981 | Schaffer | |
| 4,252,607 | A | 2/1981 | Thode | |
| 4,263,095 | A | 4/1981 | Thode | |
| 4,269,658 | A | 5/1981 | Ohkawa | |
| 4,626,400 | A | 12/1986 | Jassby | |
| 8,891,719 | B2 | 11/2014 | Howard | |
| 9,271,383 | B2 | 2/2016 | Howard | |
| 9,477,009 | B2 | 10/2016 | Borbiaux | |
| 9,596,745 | B2 | 3/2017 | Laberge | |
| 10,002,680 | B2 | 6/2018 | Laberge et al. | |
| 10,418,170 | B2 | 9/2019 | Rath | |
| 10,798,808 | B2 | 10/2020 | Zimmermann et al. | |
| 10,910,149 | B2 | 2/2021 | Rath | |
| 10,925,145 | B2 | 2/2021 | Sangermano | |
| 11,064,601 | B2 | 7/2021 | Zimmermann | |
| 11,711,884 | B2 * | 7/2023 | Wilkie | H05H 1/01 417/415 |
| 2001/0002680 | A1 | 6/2001 | Kummer | |
| 2005/0129161 | A1 | 6/2005 | Laberge | |
| 2006/0198483 | A1 * | 9/2006 | Laberge | G21B 3/008 376/100 |
| 2006/0198486 | A1 * | 9/2006 | Laberge | G10K 15/043 376/150 |
| 2014/0163939 | A1 | 6/2014 | Bourbiaux | |
| 2015/0216028 | A1 * | 7/2015 | Laberge | H05H 1/105 315/111.61 |
| 2018/0047461 | A1 * | 2/2018 | Cohen | F03H 1/0081 |
| 2019/0139650 | A1 * | 5/2019 | Laberge | G21B 1/21 |
| 2019/0141827 | A1 * | 5/2019 | Gonzalez | H05H 1/22 |
| 2020/0027572 | A1 | 1/2020 | Krasnoff | |
| 2020/0234832 | A1 * | 7/2020 | Prater | G21B 1/05 |
| 2020/0236770 | A1 | 7/2020 | Zimmermann | |
| 2020/0245445 | A1 | 7/2020 | Zimmermann et al. | |
| 2024/0062918 | A1 | 2/2024 | Laberge | |
| 2024/0062919 | A1 | 2/2024 | Zimmermann | |
| 2025/0191790 | A1 | 6/2025 | Howard | |

FOREIGN PATENT DOCUMENTS

| | | | |
|---|---|---|---|
| CN | 205069135 | | 3/2016 |
| CN | 106158051 | | 11/2016 |
| CN | 107112053 | | 8/2017 |
| CN | 110370260 | | 10/2019 |
| CN | 110785819 | A | 2/2020 |
| CN | 110786080 | A | 2/2020 |
| GB | 2064203 | | 6/1981 |
| JP | 2020518978 | | 6/2020 |
| WO | WO 2008/033587 | | 3/2008 |
| WO | WO 2018/094043 | | 5/2018 |
| WO | WO 2018/201226 | | 11/2018 |
| WO | WO 2022/155725 | A1 | 7/2022 |
| WO | WO 2022/155726 | A1 | 7/2022 |
| WO | WO 2023/173210 | | 9/2023 |

OTHER PUBLICATIONS

International Search Report and Written Opinion in PCT/CA2021/051825 dated Mar. 4, 2022 in 8 pages.

C.L. Nehl et al., "Retrospective of the ARPA-E ALPHA fusion program," J. Fusion Energy vol. 38, No. 5, pp. 506-521 (2019).

J. Huneault, "The stability of Impulsively collapsed liquid cavities," McGill University (Canada), 2019.

Ning, et al., "Optimization design of a wire load for Z-pinch plasma implosion experiments" Institute of Applied Physics, vol. 53, No. 3, Mar. 2004.

Gang, et al., "Study on K-shell X-ray production of double-shell neon gas puff Z-pinch" Acta Phys. Sin., vol. 60, No. 1, 2011.

Office Action received in Chinese Application No. 202180091471.6, dated Mar. 18, 2024.

Extended Search Report received in European Application No. 21920164.7 dated Apr. 5, 2024.

Extended Search Report received in European Application No. 21920165.4 dated Apr. 4, 2024.

Kiuttu et al., "Stabilized Liner Compressor Update," 2018 16th Int'l Conf. on Megagauss Magnetic Field Generation and Related Topics (Megagauss), IEEE, Sep. 25, 2018, pp. 1-7, doi: 10.1109/MEGAGAUSS.2018.8722677 (2018).

Tancetti et al., "Thermal energy confinement time of spherical tokamak plasmas in PI3," Nucl. Fusion, Publ. Section., Vienna, AT, vol. 65, No. 3, Feb. 28, 2025, doi: 10.1088/1741-4326/ADB8FB (2025).

European Extended Search Report in Europe Appl. No. 23769393.2 dated Jan. 19, 2026 in 8 pages.

Search Report and Written Opinion received in International Application No. PCT/CA2023/050331, dated May 18, 2023.

* cited by examiner

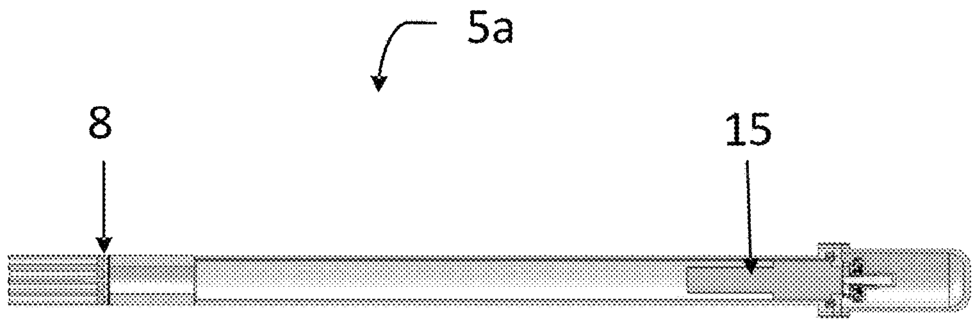
FIG. 5A Initial position 0 ms
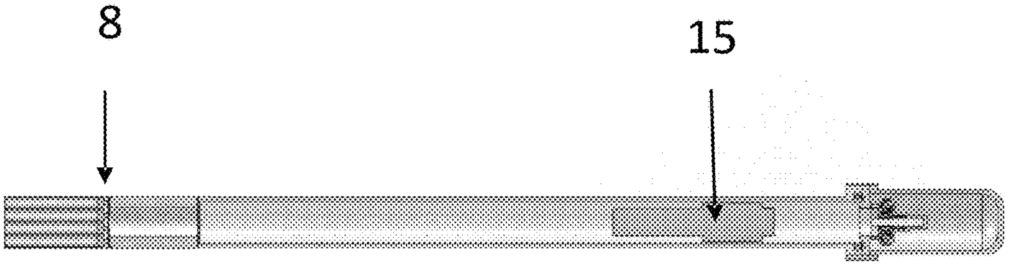
FIG. 5B 5 ms
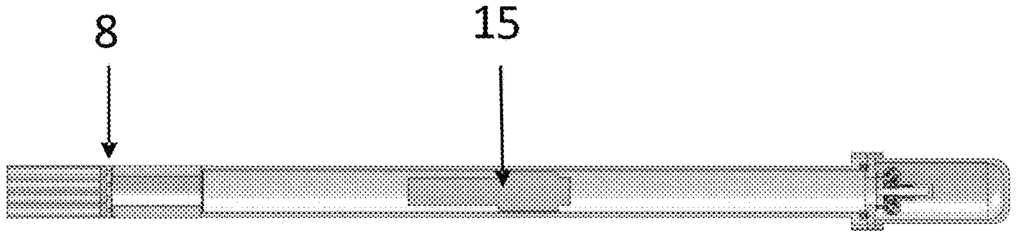
FIG. 5C 10 ms

FIG. 5D 15 ms
FIG. 5E 19 ms

| VFC flux fraction | T_final/T_initial |
|---|---|
| 0% | 14.87 |
| 10% | 16.78 |
| 20% | 17.45 |
| 30% | 17.69 |
| 40% | 17.67 |
| 50% | 17.46 |
| 60% | 17.11 |
| 80% | 15.83 |

PLASMA COMPRESSION SYSTEM UTILIZING POLOIDAL FIELD COILS

TECHNICAL FIELD

The present disclosure relates generally to a plasma compression system utilizing poloidal field coils and a method for operating same.

BACKGROUND

Unless otherwise indicated herein, the materials described in this section are not prior art to the claims in this application and are not admitted to be prior art by inclusion in this section.

General Fusion's Magnetized Target Fusion (MTF) technology uses liquid metal to compress a magnetized hydrogen isotope plasma, which in-turn, heats until the hydrogen isotopes fuse, initially, into helium or tritium, releasing energy in an energetic neutron, or proton respectively. The energetic particles are absorbed in a blanket of liquid metal that is heated as a result. The heat can be extracted providing a source of energy.

Nuclear fusion is the process of combining two nuclei, whereby the reaction releases energy. The release of energy is due to a small difference in mass between the reactants and the products of the fusion reaction and is governed by $dE=dmc^2$. Common reactants are deuterium (a hydrogen nucleus having one proton and one neutron) and tritium (a hydrogen nucleus having one proton and two neutrons). Fusion of these two reactants yields a helium-4 nucleus, a neutron, and energy captured as heat. Achieving fusion of reactants requires high temperature and high pressure (density) of the reactants. For example, fusion conditions for magnetized target fusion commercial power plant may be in the order of 150 million degrees Celsius and 800 megapascals of pressure. In the MTF approach to fusion, a plasma is created and compressed to achieve these conditions.

Plasma is a state of matter similar to gas and is composed of an ionized gas atoms and free electrons. The presence of charged particles (e.g., positive ions and negative electrons) makes plasma electrically conductive, such that it can respond to magnetic fields. A plasma may be shaped and positioned using magnetic fields, and a particularly stable configuration for a plasma is the torus shape. A plasma torus is a self-sustained magnetized plasma shaped into a toroidal configuration, with linked poloidal and toroidal (in some cases) closed magnetic fluxes. The extent of linkage of the poloidal and toroidal magnetic fluxes defines a helicity of the plasma torus. Plasma torus contained in a simply connected volume is called a compact toroid (CT). Example CT configurations include: (i) a spherical tokamak (e.g., "spheromak") configuration that exists close to a stable magnetohydrodynamic equilibrium with an internal magnetic field having both toroidal and poloidal components; and (ii) a Field Reversed Configuration (FRC), which also has a toroidal magnetic topology, but can be more elongated in the axial direction with an outer surface being similar to a prolate ellipsoid, and which has primarily a poloidal magnetic field, with no toroidal magnetic field component. CT plasmas can be formed in a range of magnetic configurations, including ones that exist in states that are in between spheromak and FRC states. Other plasma configurations are possible, for example where a conductive center shaft is used in tokamaks. It is also possible for an initial plasma torus to evolve and change its magnetic configuration during time.

Another approach to achieving fusion conditions is to mechanically compress a hydrogen plasma using means such as mechanical pistons compressing a liquid metal liner in a MTF reactor. These mechanical plasma compression systems compress the typically spheroidal tokamak type plasma within a fusion containment vessel by forming a substantially cylindrical vortex cavity into which the plasma is positioned. The cylindrical vortex cavity can be formed by rotating a liquid metal using a rotating cylinder inside the containment vessel, such that centrifugal force moves the liquid metal against the walls of the rotating cylinder, forming a liquid metal liner surrounding the vortex cavity. The liquid metal liner is collapsed by moving the pistons to radially and axially implode the vortex cavity, and create a spheroidal collapsing cavity. The plasma contained therein is compressed as the liquid metal liner collapses. As the liquid metal liner is pushed inwards around the enclosed spherical tokamak plasma, the spherical tokamak magnetic field that confines the plasma is incompletely excluded from entering the conductive liquid metal liner by the process of induction, by which the spherical tokamak plasma induces electrical currents and repels magnetic fields in the conductive liquid metal liner. As the liquid metal liner has a finite conductivity, these induced currents and associated magnetic fields do not fully repel the spherical tokamak magnetic fields, and over time, a portion of the spherical tokamak's magnetic fields enter the liquid metal liner.

A particular challenge for plasma compression systems is the tendency of a plasma to transfer heat from its core to its outer surfaces and into the vessel walls. This loss of heat into the vessel walls reduces the temperature of the plasma and thereby reduces the lifetime of the plasma, thereby reducing the probability of the fusion reaction to occur. This is particularly challenging in MTF systems employing a liquid metal liner, as the spherical tokamak magnetic field enters the liquid liner, the plasma will contact the liquid liner and transfer heat to the vessel wall. It is therefore advantageous to devise systems and methods to confine the plasma and thereby limit or prevent the plasma from interacting with the reaction vessel walls. This goal is relevant for reactors having static walls (e.g., tokamaks) or dynamic walls (magnetized target fusion).

SUMMARY

According to one aspect of the invention, there is a provided a plasma compression system comprising: a vessel configured to receive and contain a plasma and a metallic liquid medium circulating around a longitudinal rotation axis so as to at least partially bound a plasma compression region configured to receive and contain the plasma; means for controllably reducing a volume of the plasma compression region by inwardly moving the liquid medium towards the longitudinal rotation axis, wherein the liquid medium compresses the plasma; and a plurality of electrically conductive coils outside the plasma compression region and configured to generate a poloidal magnetic field in the vessel, the liquid medium, and the plasma compression region. At least some of the poloidal magnetic field within the plasma compression region extends along the longitudinal rotation axis, and at least some of the poloidal magnetic field in the liquid medium moves inwardly towards the longitudinal rotation axis with the liquid medium as the liquid medium moves towards the longitudinal rotation axis.

In some aspects, the vessel can comprise a ferromagnetic or ferrimagnetic material. The plurality of electrically conductive coils can comprise at least two substantially ring-shaped coils positioned substantially symmetrically around and substantially perpendicularly to the longitudinal rotation axis, wherein the at least two substantially ring-shaped coils are at different corresponding locations along the longitudinal rotation axis. The plurality of electrically conductive coils can also comprise at least a first coil and a second coil spaced from and substantially parallel to the first coil, wherein the plasma compression region is between the first and second coils. The electrically conductive coils can be positioned relative to the vessel wall such that the vessel walls concentrates the poloidal magnetic field within the plasma compression region.

The vessel can comprise wall portions having an inner radius in a range of 3.5 m to 5.5 m along a direction substantially perpendicular to the wall portions. Further, the plasma compression system can comprise a metallic rotating core inside the vessel. The rotating core is configured to rotate about the longitudinal rotation axis, and at least portions of the rotating core have an inner radius in a range of 1.5 m to 3 m along the direction substantially perpendicular to the wall portions.

A first power source can be configured to flow substantially constant electric current in the plurality of electrically conductive coils while the liquid medium compresses the plasma. More particularly, the first power source can be configured to flow the electric current with an AC component and a DC component, wherein the AC component can have a frequency that is less than 10 Hz and a magnitude less than 10% of a magnitude of the DC component. The first power source can also be configured to flow a substantially constant electric current over a lifetime of the plasma within the plasma compression region.

A second power source can be configured to generate a formation magnetic field at the centerline (equatorial plane) of the vessel cavity in a range of 100 mWb to 700 mWb within the plasma compression region.

According to another aspect of the invention, there is provided a plasma compression system comprising: a metallic vessel configured to receive and contain a plasma; a metallic liquid liner in the vessel and at least partially bounding a plasma compression region having a longitudinal axis; means for moving the liquid liner inwardly towards the longitudinal axis to compress the plasma in the plasma compression region; and a plurality of electrically conductive coils outside the plasma compression region and configured to generate a poloidal magnetic field in the liquid liner and the plasma compression region. At least some of the poloidal magnetic field within the plasma compression region extends along the longitudinal axis, and at least some of the poloidal magnetic field in the liquid liner moves inwardly towards the longitudinal axis with the liquid liner as the liquid liner moves towards the longitudinal axis.

The vessel can be ferromagnetic or ferrimagnetic. The electrically conductive coils can be positioned relative to the vessel wall such that the vessel wall at least partially concentrates the poloidal magnetic field within the plasma compression region. The plasma can be substantially toroidal and substantially symmetric about the longitudinal axis, wherein at least some of the poloidal magnetic field in the plasma compression region extends along a poloidal direction relative to the substantially toroidal plasma. A first electrical power source can be coupled to the electrically conductive coils and configured to generate the poloidal magnetic field within the plasma compression region with a strength sufficient to inhibit the plasma from impinging the liquid liner.

The plurality of electrically conductive coils can comprise at least two substantially ring-shaped coils positioned substantially symmetrically around and substantially perpendicularly to the longitudinal axis, wherein the at least two substantially ring-shaped coils are at different corresponding locations along the longitudinal axis.

The system can further comprise a rotating core and a liquid medium in the vessel. The rotating core can be configured to rotate and circulate the liquid medium to form the liquid liner and the plasma compression region. The rotating core can have an outer surface that is spaced from an inner surface of the vessel by a gap. The means for moving the liquid liner can comprise a plurality of implosion drivers extending through the rotating core from the gap to the plasma compression region and containing at least some of the liquid medium.

In some aspects, the plasma compression system can further comprise a pressurized fluid source in fluid communication with the plurality of implosion drivers, wherein the pressurized fluid source is configured to controllably apply pressurized gas to the plurality of implosion drivers, which causes the implosion drivers to apply pressure pulses to the liquid medium such that the liquid liner is pushed inwards to collapse the plasma compression region and compress the plasma within the plasma compression region. In some other aspects, the means for moving the liquid liner can further comprise a plurality of compression drivers fixedly mounted to an outer surface of the vessel and in fluid communication with the plurality of implosion drivers. A compression fluid in the gap is in fluid communication with the compression drivers and implosion drivers. A pressurized fluid source is in fluid communication with the plurality of compression drivers, and is configured to controllably apply pressurized gas to the plurality of compression drivers, thereby causing the compression drivers to apply first pressure pulses via the compression fluid to the plurality of implosion drivers, and thereby causing the implosion drives to apply second pressure pulses to the liquid medium such that the liquid liner is pushed inwards to collapse the plasma compression region and compress the plasma within the second region.

The plasma compression system can further comprise a plasma injector in fluid communication with the vessel and be configured to inject the plasma into the plasma compression region.

According to another aspect of the invention, there is a provided a method comprising: injecting a magnetized toroidal plasma into a plasma compression region, the plasma compression region at least partially bounded by a metallic liquid liner having a longitudinal axis; generating a poloidal magnetic field within the liquid liner and the plasma compression region, at least some of the poloidal magnetic field in the plasma compression region extending along the longitudinal axis; and compressing the liquid liner towards the longitudinal axis thereby reducing a volume of the plasma compression region containing the plasma and compressing the plasma. A liquid medium can be rotated to form the metallic liquid liner, wherein the liquid liner rotates around a longitudinal rotation axis symmetric with an axis of the plasma.

Generating the poloidal magnetic field can comprise flowing electrical current through a plurality of coils external to the plasma compression region. During said compressing, the electric current can be substantially constant. Compressing the liquid liner can comprise adjusting a trajectory of the liquid liner to dynamically adjust the poloidal magnetic field within the plasma compression region.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure. Sizes and relative positions of elements in the drawings are not necessarily drawn to scale. For example, the shapes of various elements and angles are not drawn to scale, and some of these elements are arbitrarily enlarged and positioned to improve drawing legibility.

FIGS. 2A and 2B are cross-sectional side views of different embodiments of one compression driver, wherein FIG. 2A is a compression driver according to a first embodiment, comprising a driver piston and a driver bore, and multiple implosion drivers, each implosion driver comprising a pusher piston and a pusher bore, and FIG. 2B is a compression driver according to a second embodiment comprising an accumulator in fluid communication with a drive valve, and a relief tank in fluid communication with a rebound valve.

FIGS. 5A through 5E are cross-sectional side views of one compression driver according to the first embodiment and multiple implosion drivers in operation over a time period, wherein: FIG. 5A shows the compression driver with its driver piston in a start position prior to being triggered with a motive force; FIG. 5B shows the driver piston at approximately one third of its total travel limit within the driver bore; FIG. 5C shows the driver piston as it nears pusher pistons and just before the pusher pistons are accelerated; FIG. 5D shows the driver piston at a distal end of the driver bore while the pusher pistons are accelerated down the pusher bores; and FIG. 5E shows the pusher pistons at the limit of travel within the pusher bore.

FIGS. 6A to 6D are cross-sectional side views of a part of one compression driver according to the second embodiment over a compression shot, wherein FIG. 6A shows valve states of the compression driver in a pre-shot phase, FIG. 6B shows the valve states in a compression phase, FIG. 6C shows the valve states in a rebound recovery phase, and FIG. 6D shows the valve states in an energy dissipation phase.

FIGS. 10A and B are partial cross-sectional views of different embodiments of the plasma compression system showing the plasma containment vessel with plurality of ports formed in an outer wall of the vessel, compression drivers coupled to the ports of the vessel, and the rotating core, wherein FIG. 10A shows the first embodiment of the compression drivers.

FIGS. 12A, 3B and 3C are horizontal cross-sectional half side views of the vessel of the flux conserver showing the position and configuration of the plasma with respect to the flux conserver wall and the center shaft, prior to compression.

DETAILED DESCRIPTION OF SPECIFIC EMBODIMENTS

Figure 1:
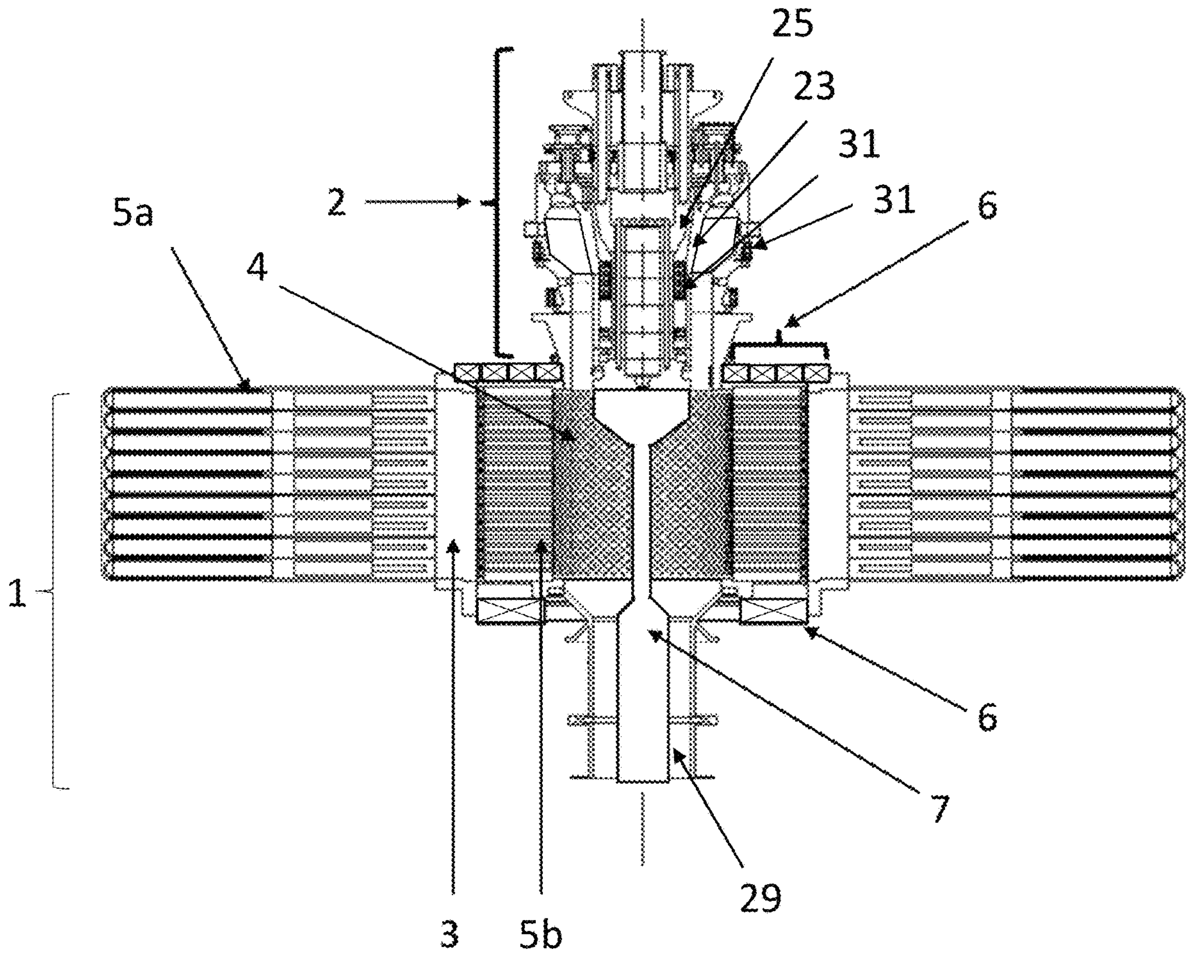
FIG. 1 is a cross-sectional side view of a plasma injector and a plasma compression system comprising a liquid metal containment vessel with poloidal field coils, and compression drivers.

Embodiments described herein relate to a plasma compression system 1 coupled to a plasma injector 2, and a method for compressing plasma injected by the plasma injector 2 into a plasma compression region of the plasma compression system 1. The plasma compression system 1 can be used in a MTF reactor to generate fusion from the compressed plasma. The plasma compression system 1 generally comprises: a liquid metal containment vessel 3, a plurality of mechanical drivers 5*a*, 5*b*, a plurality of electrically conductive poloidal field coils 6, and an electrically conductive central conductor 7. The vessel 3 contains a liquid medium such as a liquid metal that can be circulated around a longitudinal rotation axis to form a central cavity in the vessel 3 and to define a plasma compression region; the plasma injector 2 is operable to inject a plasma into the central cavity in the vessel 3 for compression in the plasma compression region. The plurality of mechanical drivers 5*a*, 5*b* are operable to move the liquid medium towards the longitudinal rotation axis and compress the plasma. The conductive central conductor 7 extends coaxially along the longitudinal rotation axis from the plasma injector, through the vessel 3 and to a lower end plate 29 of the vessel 3; the central conductor 7 is operable with the outer wall of the vessel 3 to serve as a flux conserver to limit the plasma from interacting with the vessel wall 3.

In some embodiments and as shown in FIGS. 1 to 10, the vessel 3 further comprises a rotating core 4 rotatable inside the vessel 3; the rotating core 4 has a bore with a longitudinal axis coaxial with the longitudinal rotation axis. In these embodiments, the mechanical drivers comprise compression drivers 5*a* fixedly mounted to the outside of the vessel 3 and implosion drivers 5*b* extending through the rotating core 4 from an outer surface to an inner (bore) surface. The rotating core 4 is rotatable about the longitudinal rotation axis to circulate the liquid medium and form a liquid liner defining the central cavity within the bore, and the implosion drivers 5*b* are operable to collapse the liquid liner and compress the plasma compression region against the plasma in the cavity.

Instead of the plurality of mechanical drivers 5*a*, 5*b* as shown in FIGS. 1 to 10, it will be appreciated by those skilled in the art that there are alternative means to controllably reduce a volume of the plasma compression region to inwardly move and collapse a liquid medium thereby compressing the plasma. For example, an acoustic wave impinging upon a liquid medium (not shown) can be used to subject the liquid medium to a force that will cause movement of the medium. In another embodiment (not shown), explosive gas or compressed gas may be used to apply a force that moves a liquid medium. If these forces are applied in a controlled way, these means may be used to collapse a hollow liquid liner into a cavity to compress a plasma located with that cavity.

Instead of circulating the liquid medium to create the central cavity such as by the rotating core shown in FIGS. 1 to 10, it will be appreciated by those skilled in the art that the central cavity may be created within a liquid medium by various means that do not require rotation of the liquid medium. For example, a central cavity within a liquid medium may be formed by a 'hollow cylinder waterfall method' (not shown), whereby the force of gravity moves the walls of a hollow cylinder of liquid medium from a liquid medium reservoir located at the top of the vessel to the bottom of the vessel, and whereby a drain and pump are provided at the bottom of the vessel to capture and recycle the liquid medium back to the top in a continuous manner. Other means of forming cavities in a collapsible liquid medium are known in the art.

A first electrical power source ("poloidal field generator", not shown) is electrically coupled to and supplies an electrical current to the poloidal field coils 6 to externally generate a poloidal magnetic field in the vessel wall 3, the liquid medium, and the plasma compression region. The externally generated poloidal magnetic field prevents or impedes the plasma from contacting the liquid liner wall and disadvantageously cooling the plasma. At least some of the externally generated poloidal magnetic field in the plasma compression region extends along the longitudinal rotation axis and at least some of the externally generated poloidal magnetic field is soaked in the liquid medium and tends to stay pinned within the liquid medium. Consequently, the external poloidal magnetic field will move with the liquid medium when the liquid medium moves inwardly towards the longitudinal rotation axis during a plasma compression operation.

Figure 11A:
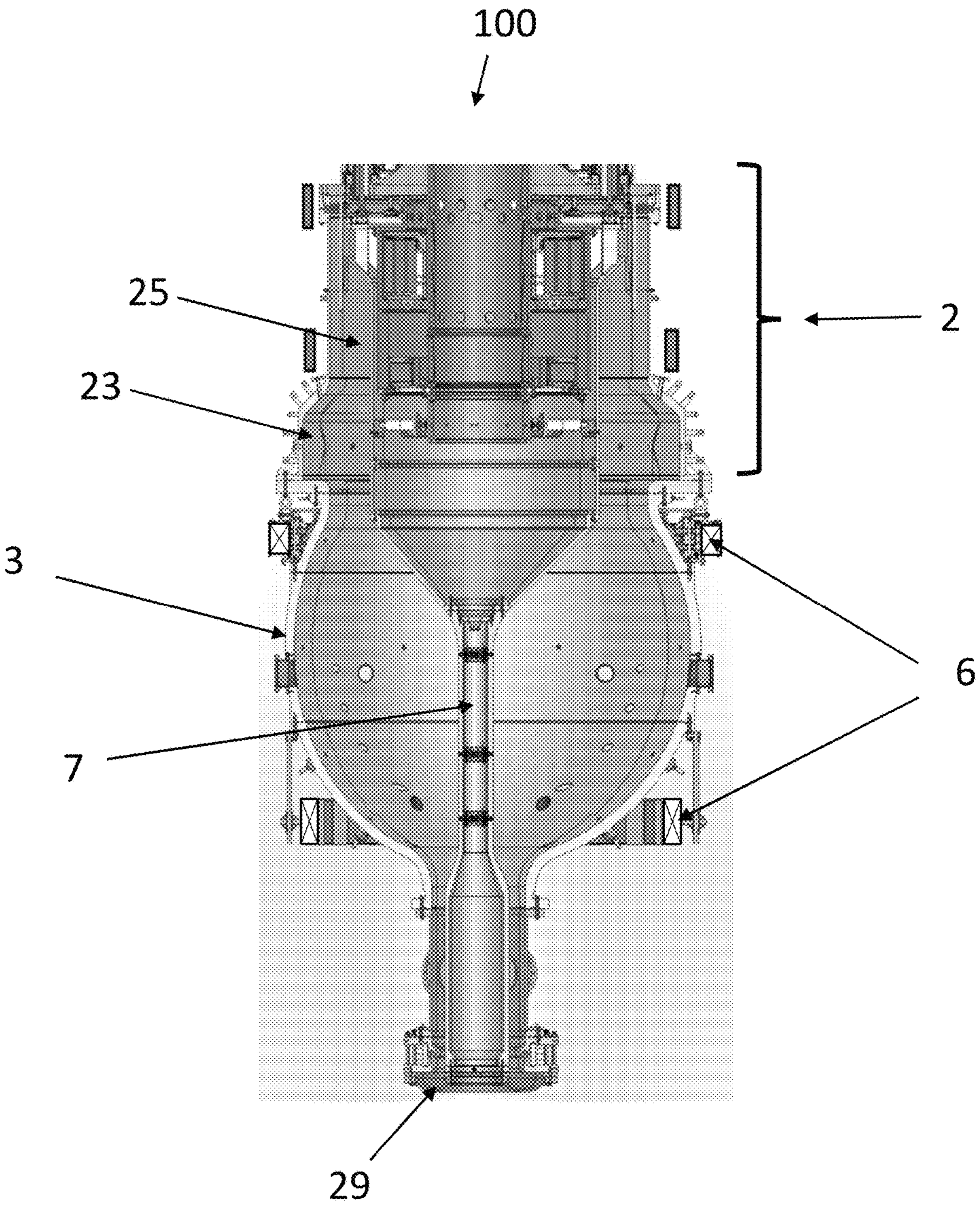
FIG. 11A is cross-sectional side view of an experimental plasma injector and flux conserver system, comprising a vessel, solid conductive center shaft, and poloidal field coils.
Figure 11B:
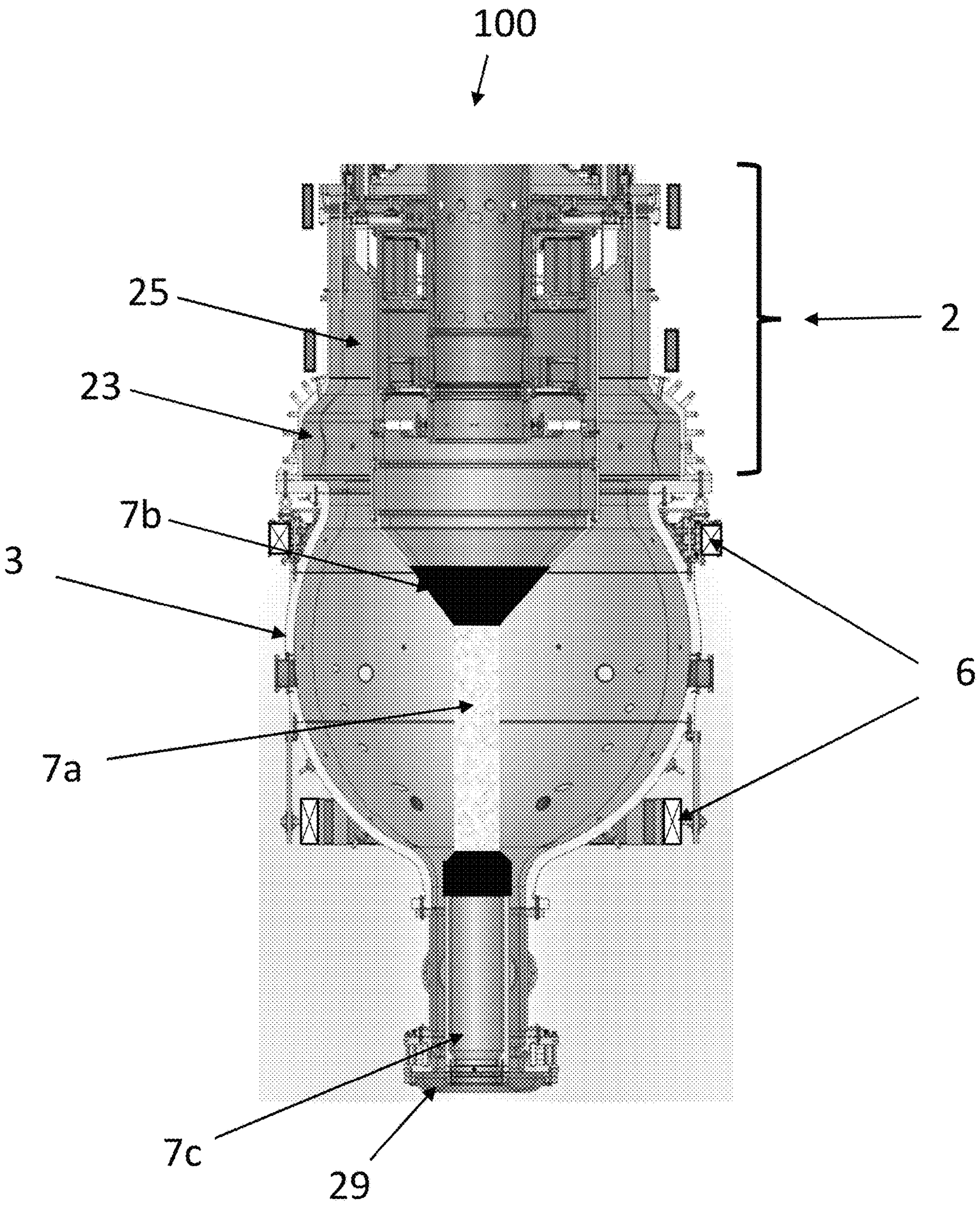
FIG. 11B is a cross-sectional side view of an experimental plasma injector and flux conserver system, comprising a vessel, conductive liquid metal center conductor, and poloidal field coils.

To serve as a flux converser, the vessel walls 3 are constructed of a conductive material such that when an electrical current is conducted along the central conductor 7, along the end plate 29, then along the vessel walls 3 and to the liquid medium, a magnetic force is generated and magnetic repulsion occurs between the liquid medium and the magnetized plasma. As a result, magnetic flux between the plasma and the liquid medium is conserved. In this configuration, the liquid liner serves as a flux containing vessel, or "flux conserver" to lengthen the duration of magnetic confinement of plasma. As will be described in more detail below, the central conductor 7 can be an electrically conductive solid metal shaft such as shown in FIG. 11A, or a liquid metal that flows continuously from the plasma injector to the bottom of the vessel, as shown in FIG. 11B. The flux conserver contributes to confinement of the magnetized plasma, but may be insufficient on its own to prevent the plasma from interacting with the liquid liner wall during plasma compression. Therefore, an electrical current is conducted through the poloidal field coils 6 to generate a poloidal magnetic field that is applied to the plasma to effectively lift the plasma off the liquid liner wall. By reducing or eliminating plasma-liquid liner wall interaction and the progressive diffusion of the plasma fields into the liquid liner wall, plasma confinement is expected to be significantly improved.

The flux conserver also plays a role in stabilizing the magnetically confined plasma. Fast localized changes to the plasma magnetic configuration, like those that are a result of inherent magnetized plasma instabilities, inductively react with the liquid metal liner. These reactions provide restoring forces on the plasma and the localized magnetic perturbations. This stabilizing effect is diminished as the plasma is held away from the liquid metal liner by an external poloidal field. Without being bound by theory, it is theorized that that there is an optimal practical amount of external poloidal field that is high enough to keep the plasma off the liquid metal liner wall, reducing heat loss, but not so high as to move the plasma so far from the liquid metal liner wall that the plasma does not benefit from the stabilizing effect of the proximal liquid metal liner wall.

According to one embodiment and referring to FIGS. 1 to 10, the plasma injector 2 is coupled to the plasma compression system 1 and comprises an outer electrode 23 that is coaxial and surrounds the upper portion of the central conductor 7 thus defining an annular plasma propagation channel 25 therein between. A fuel injector (not shown) having one or more valves injects a plasma fuel into an upstream end of the plasma propagation channel 25. The one or more gas valves can be in fluid communication with the a plasma fuel source (not shown) and can be arranged as a ring around the periphery of the plasma injector 2 to symmetrically inject a precise quantity of plasma fuel into the channel 25. The liquid metal containment vessel 3 has an upper end with an entrance opening aligned with and in fluid communication with the plasma propagation channel 25, an outer side wall with a plurality of ports, and a lower end closed by the lower end plate 29. The central conductor 7 is connected to the plasma injector 2 and the lower end plate 29 and extends into the vessel through the upper opening. The rotating core 4 is rotatable inside the vessel 3 and has an outer surface spaced from an inner surface of the vessel outer side wall 3 to define an annular gap 10 (see FIGS. 2A, 4), and an inner surface that defines an interior volume. The vessel 3 and rotating core 4 in the illustrated embodiment are cylindrical; however, the vessel 3 and rotating core 4 can have different geometries according to alternative embodiments. For example, the vessel 3 can be spherical or ovoid (not shown), and the rotating core 4 can have an outer surface that is straight (cylindrical) or curved with a curvature conforming to the curvature of the inner wall of the vessel 3, and an inner surface that can be straight (cylindrical) or curved (not shown). In another example, the inner wall of the vessel 3 can have circular steps of varying radial diameters (not shown), and the rotating core 4 can have an outer surface that is stepped with radial diameters conforming to the steps in the inner wall of the vessel. The rotating core 4 may consist of a unitary cylindrical unit, or in an alternative embodiment may consist of multiple, shaped sections (not shown) that are joined together to form the rotating core 4. The construction of the rotating core 4, or its sections, may use traditional metal forming and millright techniques, or may use metal printing techniques to create an internal webbed structure that optimizes the topology and stress loading within the rotating core 4.

The construction of the vessel 3 may be a singular cylinder, or in an alternative embodiment the vessel 3 may be assembled from a series of stacked rings (not shown) having an outer surface that is straight (cylindrical) or curved with a curvature conforming to the curvature of the inner wall of the vessel 3, and an inner surface that can be straight (cylindrical) or curved (not shown). The assembled rings may be joined by means known in the prior art, for example by welding the stacked ring interfaces or by use of other means to apply axial tension force to stacked ring assembly, such as bolts. The vessel 3 outer wall can be composed of a ferromagnetic or ferrimagnetic material.

The rotating core 4 contains a liquid medium which can be circulated by the rotating core 4 to create a liquid liner surrounding a cavity (not shown). A liquid circulating system (not shown) can be provided to direct the flow of the liquid medium in the vessel 3. The circulating system can comprise plurality of valves, nozzles, pipe-network and one or more pumps to get the desired flow of liquid medium in the vessel 3. In this embodiment, the circulating system is configured to flow the liquid medium into the vessel 3 to form a liquid liner having an inner cavity with a substantially cylindrical shape; however in other embodiments, the circulating system can be configured to circulate the liquid medium in the vessel 3 to form a liquid liner with an inner cavity having other shapes, such as spherical, conical or other desired shapes.

Plasma can be injected into the central cavity by the plasma injector 2, and the compression drivers 5*a* are operable to compress a compression fluid and transmit a pressure pulse across the annular gap 10, which causes the implosion drivers 5*b* to push the liquid medium inwards to collapse the liquid liner 27 and compress the plasma. The liquid medium can be a liquid metal such as lithium and the compression fluid can be a light gas such as helium.

In one embodiment, the central conductor 7 is a solid metal shaft such as one used in an experimental prototype shown in FIG. 11A. Referring to FIGS. 1 and 11A, the solid metal central conductor 7 comprises an upper portion positioned within the plasma injector 2 and a lower portion positioned within the vessel 3; a distal end of the central conductor 7 is connected to an end plate 29 of the vessel 3. The upper central conductor portion can have a cylindrical, a conical or a similar shape, while the lower central conductor portion can be an elongated shaft extending centrally throughout the length of the vessel 3. The central conductor 7 is made from an electrically conductive and vacuum-compatible material. A second electrical power source ("current pulse generator" (not shown)) is electrically coupled to the central conductor 7 and formation field coils 31, and is operable to transmit a formation current pulse and a toroidal field sustainment current pulse to the upper portion of the current conductor 7, which travels along the lower portion, across the end plate 29 and back along the outer wall of the vessel 3. As the current pulse is transmitted, a high voltage is formed across an annular plasma propagation channel in the plasma injector 2 causing plasma fuel therein to break down, and forming a magnetized plasma in the plasma injector 2. A magnetic force is generated and magnetic repulsion occurs between the vessel wall 3 and the magnetized plasma. The current pulse generator can be configured to transmit a formation current pulse and toroidal field sustainment current pulse to produce a magnetic flux at the centerline (equatorial plane) of the vessel cavity in a range of 100 mWb to 700 mWb within the plasma compression region.

In another embodiment as shown in FIG. 11B, the central conductor 7 comprises a flowing liquid metal 7*a* that flows from the plasma injector 2 to the bottom of the vessel 3. A liquid metal reservoir 7*b* in the plasma injector 2 contains a liquid metal 7*a*, which flows out through an outlet formed in the liquid metal reservoir 7*b*. The liquid metal 7*a* flows through the vessel 3 and is collected in a catcher 7*c* that can be positioned, within the end plate 29. The liquid metal 7*a* from the catcher 7*c* can be recirculated back into the liquid metal reservoir 7*b* using one or more pumps (not shown). The flowing liquid metal conductor can flow continuously or the flow can be regulated using a valve that is in communication with the reservoir's outlet. The liquid metal 7*a* can flow from the liquid metal reservoir 7*b* under gravity and/or be discharged under pressure.

Referring particularly to FIGS. 2A, 4, 5A-E, 7A and 10A, the compression drivers 5*a* each comprise a driver bore 13 and a driver piston 15 slideable therein to compress the compression fluid. The driver bore 13 has a driver bore wall 14 fixedly mounted to an outer surface of the vessel wall 3 and has a distal end in fluid communication with a corresponding port 12 in the vessel wall 3. The implosion drivers 5*b* each comprise a pusher bore 9 with a pusher piston 8 slideable therein. The pusher bore 9 extends through the rotating core 4 and has a proximal end in fluid communication with the annular gap 10 and a distal end in fluid communication with the liquid medium. The compression fluid fills the annular gap 10 and is in fluid communication with the driver and pusher pistons 15, 6.

When the rotating core 4 rotates, e.g. by means of electric drive motors, steam turbine or other form of rotational drive, the liquid medium fills the pusher bores 9 due to centripetal force and the liquid liner 27 defining the cavity 28 is formed. The plasma injector 2 injects plasma into this cavity. Since the liquid medium is fully contained within the rotating core 4 (i.e. not contacting the vessel wall 3), it is in solid body rotation with minimal turbulence or cavity surface perturbation. In a compression operation, a prime mover is actuated and pushes the driver pistons 15 toward the port 12 in the vessel wall 3, thereby compressing the compression fluid in the annular gap 10 and creating the pressure pulse. This applies pressure on the pusher pistons 6, such that the pusher pistons 6 push the liquid medium inwards to collapse the liquid liner 27 and compress the plasma. A shear layer of the compression fluid is formed in the annular gap 10; since the shear layer is a light gas, the power required to drive the rotating core 4 is significantly lower compared to a design which uses a rotor immersed in the liquid medium and creates a shear layer of the liquid medium.

Each implosion driver 5*b* has a pusher piston 8 with a mass that is lower than a mass of the driver piston 15, and a pusher bore 9 with a length that is shorter than a length of the driver bore 13. Consequently, the compression drivers 5*a* convert a longer, lower power mechanical input in a stationary structure into a shorter, higher power mechanical output in the implosion drivers 5*b* in the rotating core 4. This is useful in applications that require a brief pulse of high pressure, such as in the plasma compression system developed by General Fusion Inc.

Figure 2A:
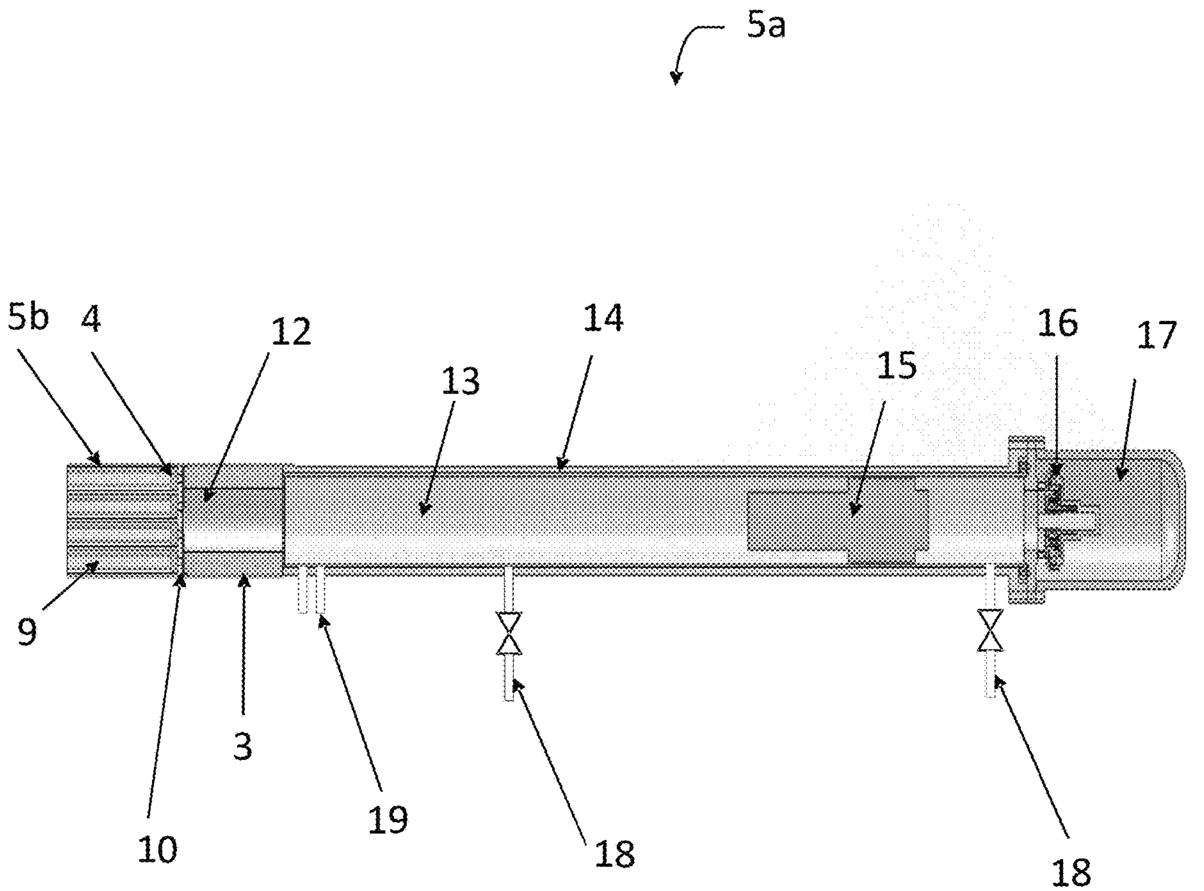
Figure 2B:
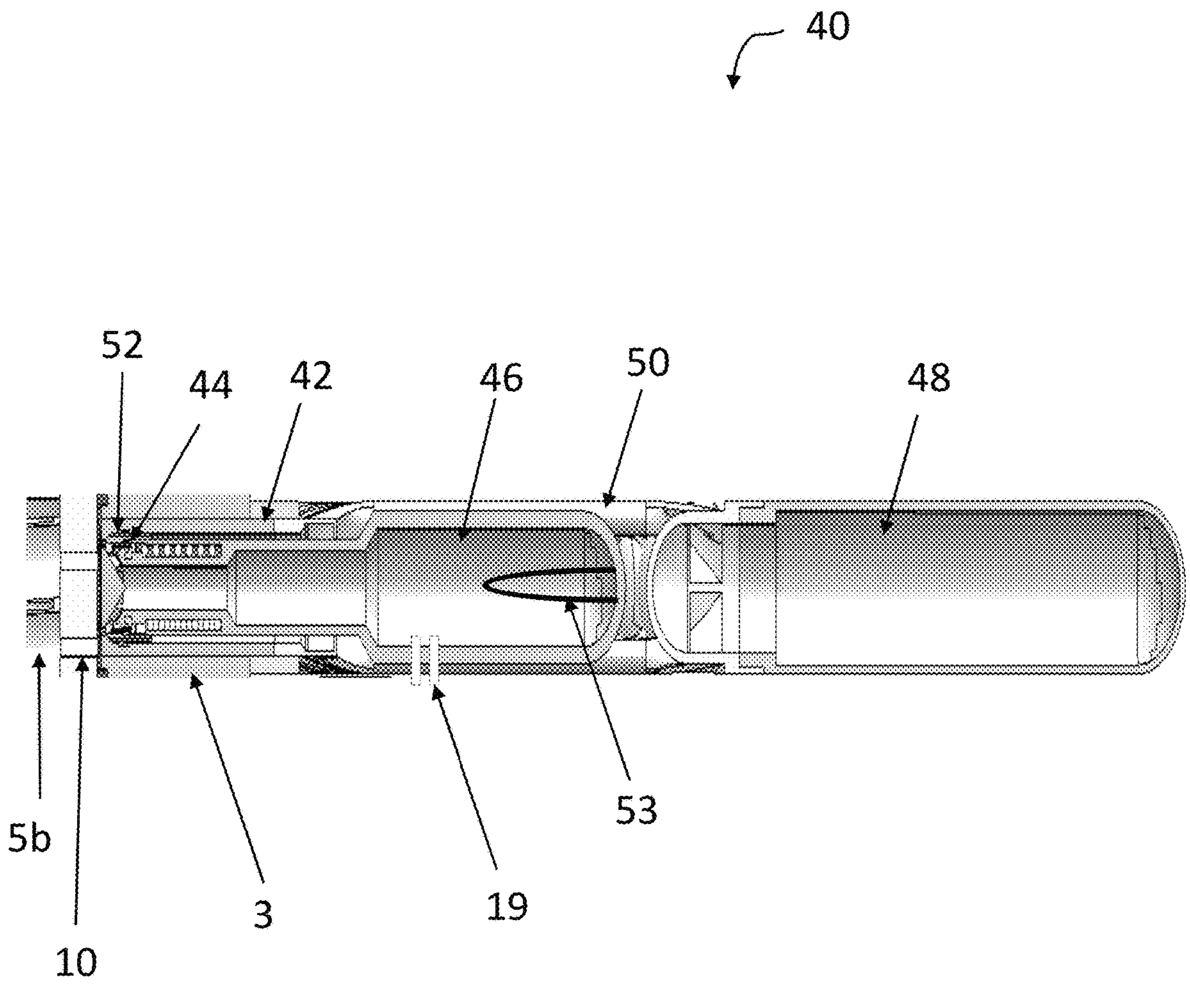
Figure 3:
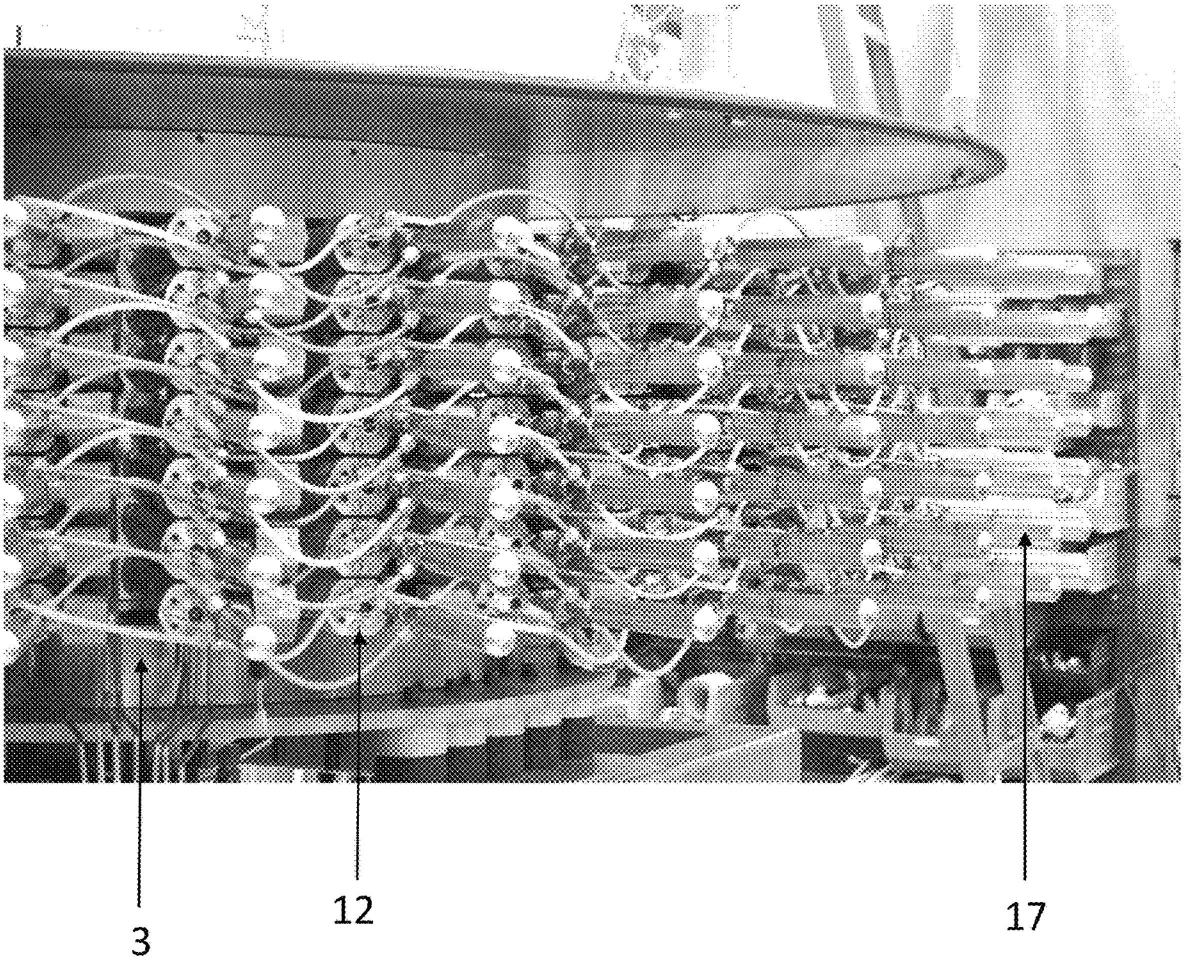
FIG. 3 is a photograph of some of the compression drivers attached to the vessel, according to a prototype embodiment.

Referring particularly to FIGS. 1 and 2A, the plasma compression system 1 comprises a plurality of compression drivers 5*a* and implosion drivers 5*b* that together can implode the liquid liner 27 with an ability to tune the implosion trajectory. The prime mover in this embodiment comprises an accumulator 17 coupled to a proximal end of the driver bore 13 by a valve 16, which can be opened to discharge a high pressure gas ("driver fluid") to move the driver piston 15 and compress compression fluid in the driver bore 13 in front of the driver piston 15. For the purpose of this application, the compression fluid can mean any fluid that can be compressed and can in one implementation be a gas. In another implementation, the compression fluid can be a mixture of a gas and a liquid medium, as long as the compression fluid in the driver bore 13 between the pistons 15 and 6 is compressible. In the illustrated embodiment, each compression driver 5*a* comprises its own accumulator 17; however in alternative embodiments, multiple compression drivers 5*a* can share a single accumulator, for example, one accumulator can be provided for each layer of compression drivers 5 (not shown), or a single accumulator can be provided for all the compression drivers 5*a* (not shown).

In alternative embodiments, the prime mover can comprise an electromagnetic source, or the prime mover can comprise a mechanical spring. Electromagnetic coils (not shown) can wind around the driver bore 13, and can be controlled to drive the driver piston 15 along the driver bore 13.

Prior to a compression operation, the driver and pusher pistons 15, 8 are in an initial position (see FIG. 5A). In the initial position, the compression fluid fills the driver bore 13 in front of driver piston 15 and the annular gap 10, and is in fluid communication with the pusher pistons 6; the pressure of the compression fluid between the pistons 15 and 8 in their initial positions is significantly less than the driver fluid pressure in the accumulator 17. For example, in one implementation the pressure of the compression fluid can be about 0.5 MPa, however it can be less or more than 0.5 MPa as long as it is significantly lower than the pressure of the driver fluid of the accumulator 17.

The pusher bores 9 will be filled with the liquid medium when the rotating core 4 rotates, such that the liquid medium pushes on the inner face of the pusher pistons 8, due to the centripetal force resulting from the rotation of the rotating core 4. In another implementation, a gas, mechanical means, or magnetic field can also apply pressure to the pusher piston 8 to prevent the pusher piston from being inadvertently accelerated down the pusher bore 9 (until a pre-determined/desired time). A retaining means, such as for example a ledge (not shown), can be provided at/near the open end of the pusher bore 9 to prevent the pusher piston 8 from being dislodged out of the pusher bore 9. In addition, an additional retaining means can be provided at the proximal end (not shown) in order to prevent the pusher piston 8 being pushed into the annular gap 10 due to the pressure applied from the liquid medium in the pusher bore 9.

The driver and the pusher pistons 15, 8 can be made of any suitable material, such as for example, a stainless steel or a titanium alloy or any other suitable material that does not react with the liquid medium and/or the driver fluid and/or the compression fluid. In this embodiment, a diameter of each of the driver bores 13 and the driver pistons 15 is greater than a diameter of each of the pusher bores 9 and the pusher pistons 8; however, the diameter of each pusher bore 9 (pusher piston 8) can be the same or larger than the diameter of each driver bore 13 (driver piston 15) in alternative embodiments.

The valve 16 can be any kind of controllable fast valve. For example, the valve 16 can be a gas driven valve or an electromagnetic valve or any other suitable fast acting valve. The valve size and driver fluid pressure can be selected to allow a sufficient flow rate to accelerate the driver piston 15 down the driver bore 13 within a target time period.

During operation, the acceleration profile of the driver piston 15 can be controlled by controlling the pressure of the driver fluid in the driver bore 13 behind the driver piston 15. The acceleration profile of the driver piston 15 can be adjusted by adjusting the pressure behind the driver piston 15 (pressure of the accumulator 17). For example, the driver fluid pressure on the driver piston 15 can be adjusted by adjusting the valve 16 opening size or duration to control the driver fluid flow from the accumulator 17 and/or venting driver fluid from the driver bore 13 via ports 18 in the driver bore 13 behind the driver piston 15; these ports 18 have controllable valves (not shown) similar to the driver fluid valve 16. Means for adjusting the valve 16 opening size or duration to control the driver fluid flow from the accumulator 17 may be accomplished by pneumatic valve control means or electromagnetic valve control means. The acceleration profile of the driver piston 15 can also be controlled by controlling the pressure of the compression fluid in front (downstream) of the driver piston 15. Ports 18 (see FIG. 2A) in the wall of the compression driver 5*a* between the driver pistons 15 and the vessel wall 3 can be controlled to inject or vent the compression fluid. In addition, additional compressible fluid can be injected near the proximal end of the driver bore 13 to slow down the driver piston 15 to prevent impact with vessel 3. The length of the driver bore 13 can be designed to be long enough so that the trajectory of the driver piston 15 can be tuned by changing the pressure of the driver fluid and/or the pressure of the compression fluid. A number of sensors (not shown) can be provided to measure the position of the driver piston 15 or the opening duration of the driver fluid valve 16 and provide the measured signals to a controller (not shown). In another implementation, arc heating of the compression fluid by means of an electric arc generated across two electrodes 19 positioned at the distal end of the driver bore 13, between the compression driver piston 15 and the rotating core 4 may be used to tune the trajectory of the compression driver pistons 15 and pusher pistons 8.

In an alternative embodiment, an electromagnetic coil can control the opening duration of the driver fluid valve 16, which controls how much high pressure fluid enters the driver bore 13, which can be operated to control the acceleration of the driver piston 15. Alternatively, the acceleration profile of the driver piston can be directly controlled electromagnetically. In the embodiment wherein the prime mover comprises electromagnetic coils wrapped around the driver bore wall 14, an electromagnet electrically-conductive element in the driver piston, and an electromagnetic source coupled to the electromagnetic coils, can be operated to control the acceleration of the driver piston.

Figure 4:
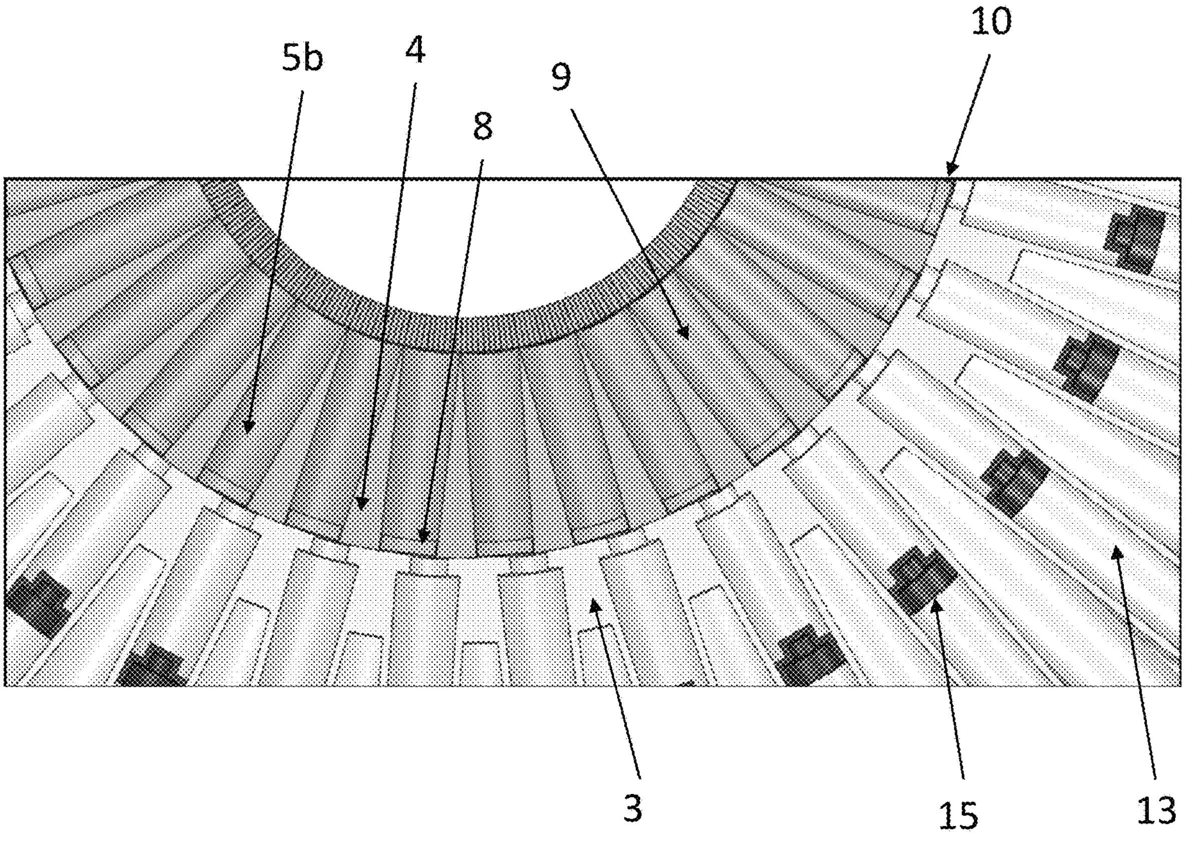
FIG. 4 is a partial cross-sectional plan view of the plasma compression system having compression drivers according to the first embodiment, showing the orientation of the compression drivers on the vessel and the orientation of the implosion drivers in the rotating core.

Referring particularly to FIG. 4, the compression drivers 5*a* are positioned radially on the outer surface of the vessel wall 3 and the implosion drivers 5*b* consisting of pusher pistons 8 within pusher bores 9 extend radially within the rotating core 4. The compression driver pistons 15 are shown midway along their inward travel within the driver bore 13 toward the rotating core 4. In alternative embodiments the compression drivers 5*a* and implosion drivers 5*b* can be positioned non-radially to the vessel 3 and rotating core 4, so long as the compression drivers 5*a* are positioned perpendicularly (i.e. normal), relative to the axis of rotation of the rotating core 4, and the implosion drivers 5*b* are positioned perpendicularly, relative to the axis of rotation of the rotating core 4.

Referring particularly to FIGS. 5A, 5B, 5C, and 5D, and 5E, a compression operation involves rapidly moving each driver piston 15 towards the vessel wall port 12 thereby compressing the compression fluid in the annular gap 10 and creating a pressure pulse against the pusher pistons 8, which then move inwards within the pusher bores 9 and pushes the liquid medium inwards through the rotating core 4 and into the vessel 3. Four basic stages of the compression operation are shown, wherein: Stage 1 is the initial (start) stage before the compression driver is triggered. In this stage the accumulator 17 is fully charged, the valve 16 is closed and the pistons 15, 6 are in their initial positions (FIG. 5A).

In Stage 2 (FIGS. 5B and C), the driver valve 16 is opened and the driver fluid in the accumulator 17 passes through the driver valve 16 and enters the driver bore 13 behind the driver piston 15, causing the driver piston 15 to accelerate along the driver bore 13 toward the rotating core 4. During Stage 2, the potential energy stored as a high pressure of the fluid in the accumulator 17 is converted into a kinetic energy in the motion of the driver piston 15 and the pressure of the compression fluid contained in the driver bore 13 rises. In Stage 3 (FIG. 5D, 15 ms) the driver piston 15 nears the rotating core 4, and the compressible fluid pressure in the annular gap 10 rises sharply as it absorbs the kinetic energy of the driver piston 15, such that the compression fluid pressure exceeds the pressure of the liquid medium in the pusher bores 9 holding the pusher pistons 6 in place. In Stage 4 (FIG. 5E, 19 ms) the pusher pistons 6 accelerates rapidly, pushing the liquid medium out of the pusher bores 9 and the rotating core 4.

Figure 7A:
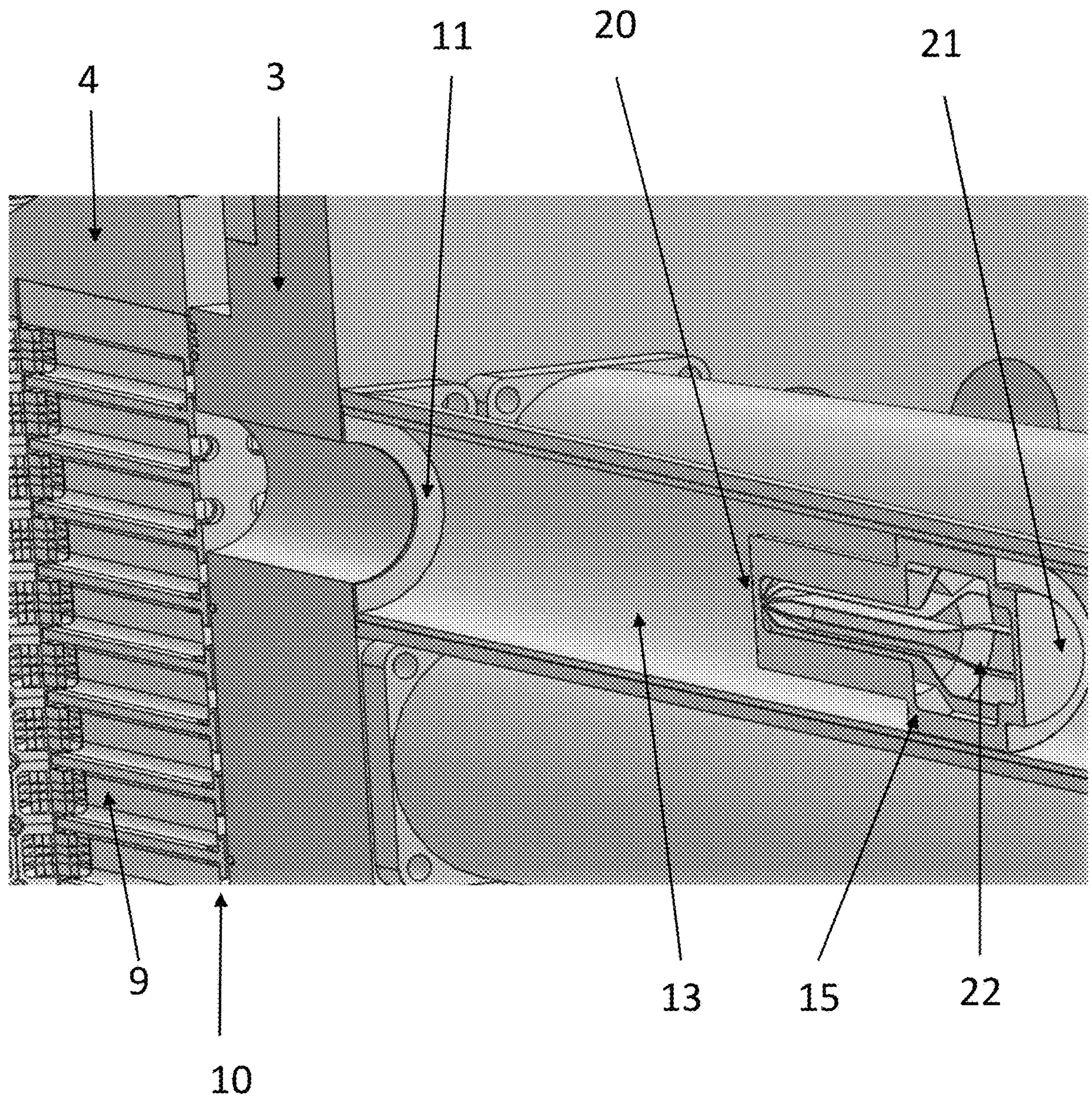
FIG. 7A is a partial cross-sectional perspective view of the driver piston of the first embodiment of the compression driver and multiple pusher pistons, in proximity to the vessel wall.
Figure 7B:
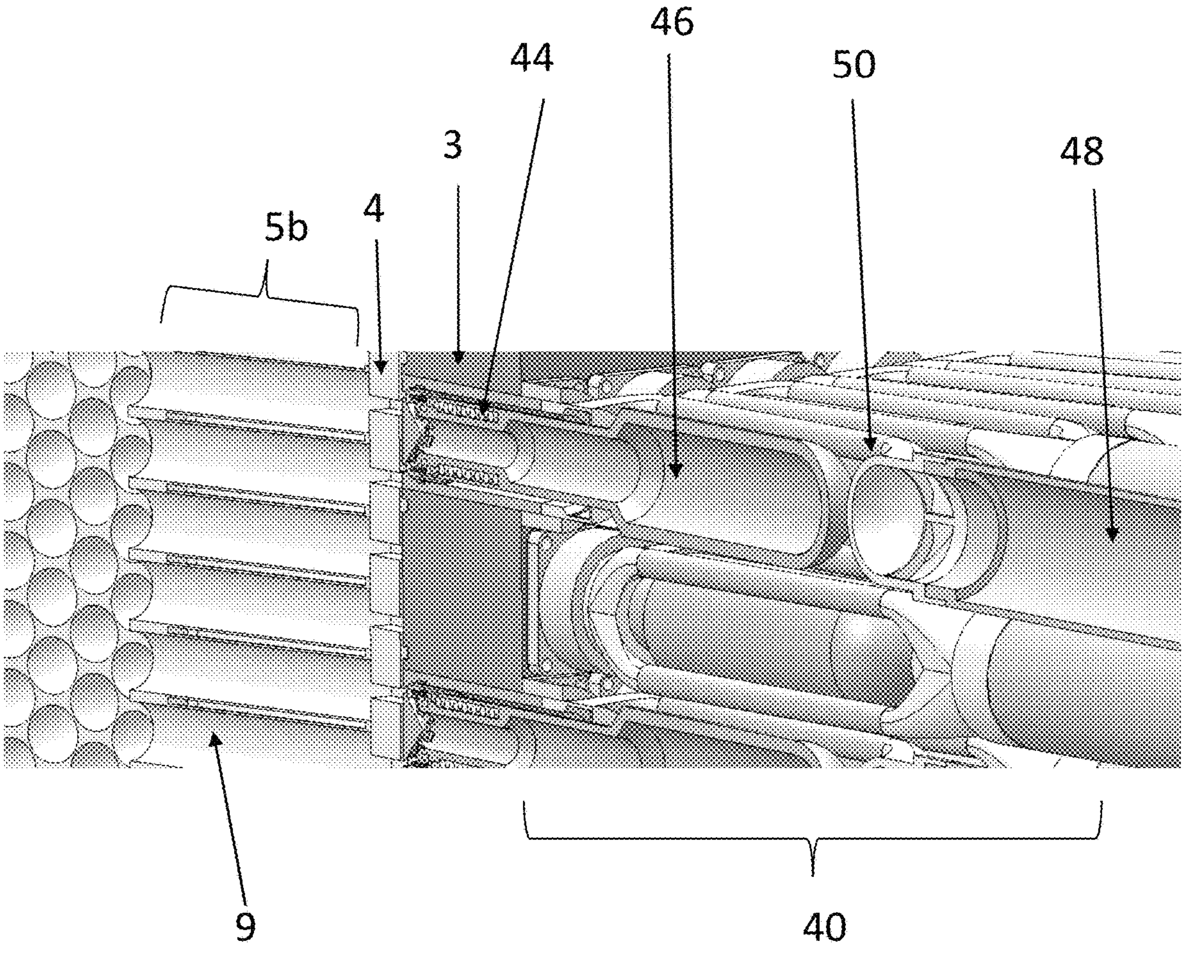
FIG. 7B is a partial cross-sectional perspective view of the multiple accumulators and drive valves of the second embodiment of the compression driver and multiple push pistons in proximity to the vessel wall.

Referring to FIG. 7A, an annular face surface 11 is provided at the distal end of the driver bore 13 and the vessel wall port 12. During the compression operation, the compression fluid applies an inward force on the annular face surface 11; in other words, the annular face surface 11 applies an inward force on the vessel 3 and serves as a pressure balancing lip such that the pressure pulse generated by the driver piston 15 will offset or reduce the pressure pulse generated by the pusher pistons pushing on the liquid medium in the pusher bore 16 and thus will reduce (minimize) the stress imparted by the compression drivers 4 on the vessel 3. Additionally, the driver piston 15 has a distal end 20 designed to cooperate with the annular face surface 11 to define an annular channel when the driver piston 15 reaches the vessel wall 3, wherein the compression fluid is highly compressed. The high pressure of the compression fluid in the annular channel serves to slow down the driver piston 15 and prevent the impact with the annular face surface 41 and the vessel wall 3.

More particularly, the driver piston 15 comprises a cylindrical first section with a distal end 20 and a diameter corresponding to the diameter of the vessel wall port 12, and a cylindrical second section with a proximal end 21 and a diameter corresponding to the diameter of the driver bore 13; the two sections are connected by an annular ledge. The annular rim of the first section and the annular ledge along with the annular face surface 11 form the aforementioned annular channel. Persons skilled in the art would understand that the driver piston 15 can have other shapes in alternative embodiments. A number of gussets 22 are formed inside the periphery of the driver piston 15 to further reduce weight while maintaining strength and the stiffness.

Figure 8:
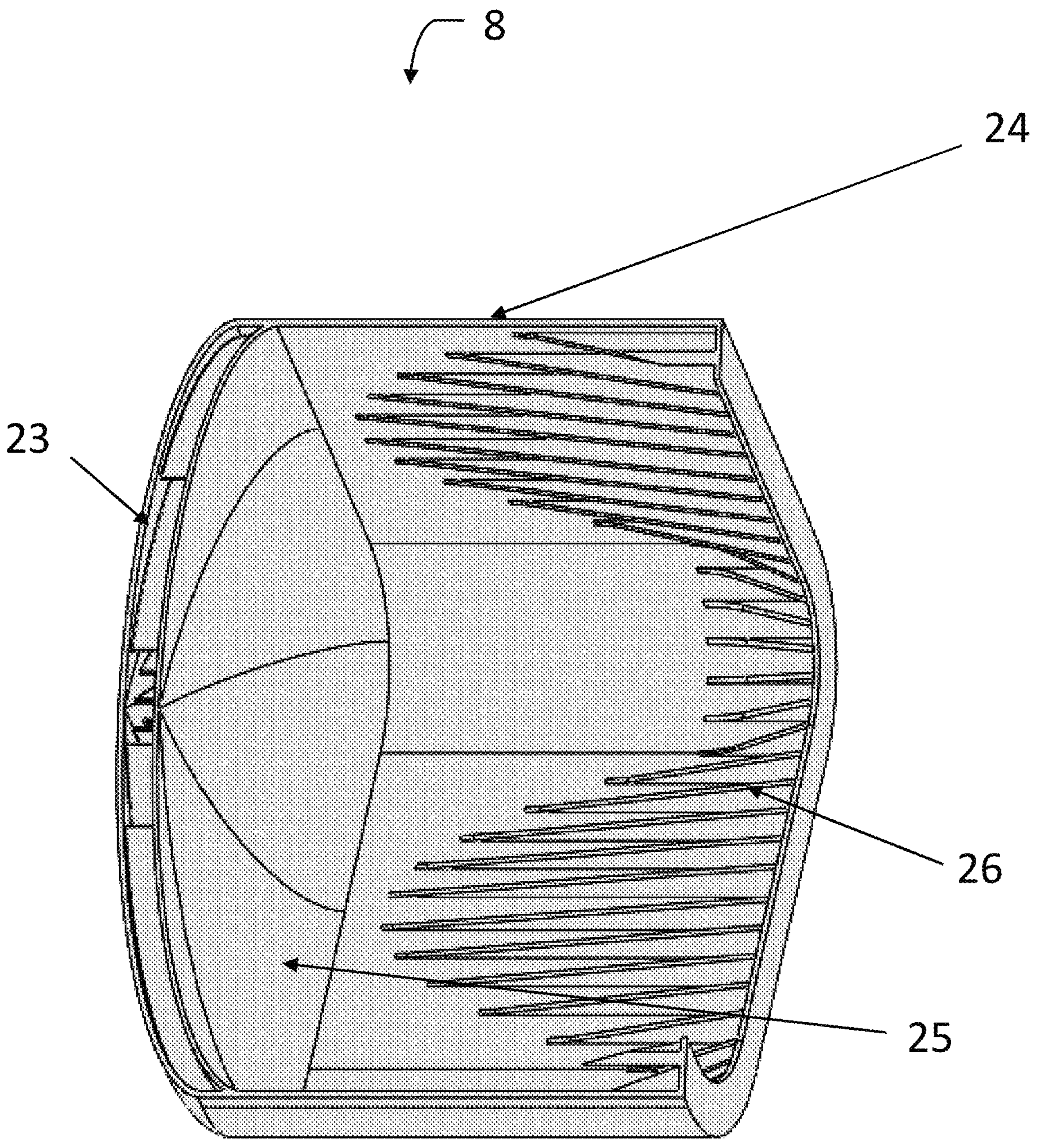
FIG. 8 is a cross-sectional perspective partial view of a pusher piston according to one embodiment.

Referring to FIG. 8 the pusher piston 8 in this embodiment has a planar or curved outer (proximal) wall 23, an inner (distal) wall 25 and a side wall 24. The inner wall 25 faces the liquid liner 27, and the side wall 24 interfaces with the pusher bore 9. The outer wall 23 faces the annular gap 10. The pusher piston 8 can further comprise a plurality of gussets 26 formed at the side wall 24. The gussets 26 are configured to increase the stiffness of the pusher piston 8. In one implementation, the side wall 24 can be a solid plate that encloses the gussets 26 such that the gussets 26 are not in contact with the fluid contained in the pusher bore 9. Persons skilled in the art would understand that the gussets 26 can be omitted in alternate embodiments, which may instead use a material that can provide the desired stiffness (and lightness) or by adding different stiffener features. The pusher piston 8 can further comprises a number of seal seats (not shown) around the circumference of the side wall 24 or positioned on the outer wall 23.

Figure 9A:
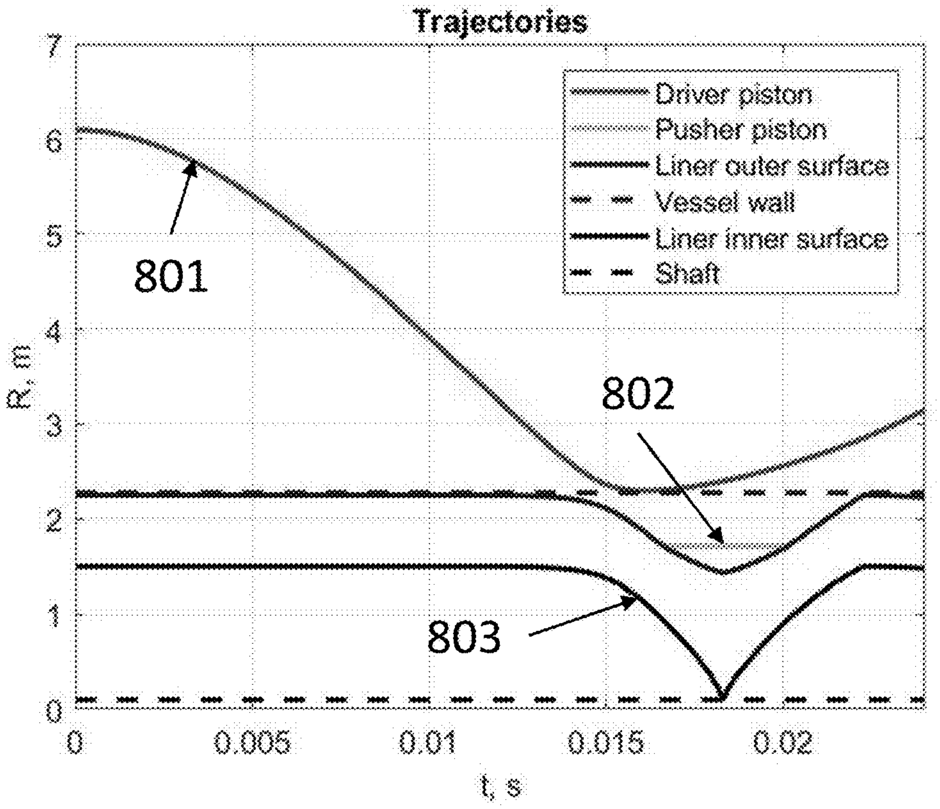
FIG. 9A is a graphical presentation of position trajectory over time of a driver piston, a pusher piston, and a liner interface during a compression operation.
Figure 9B:
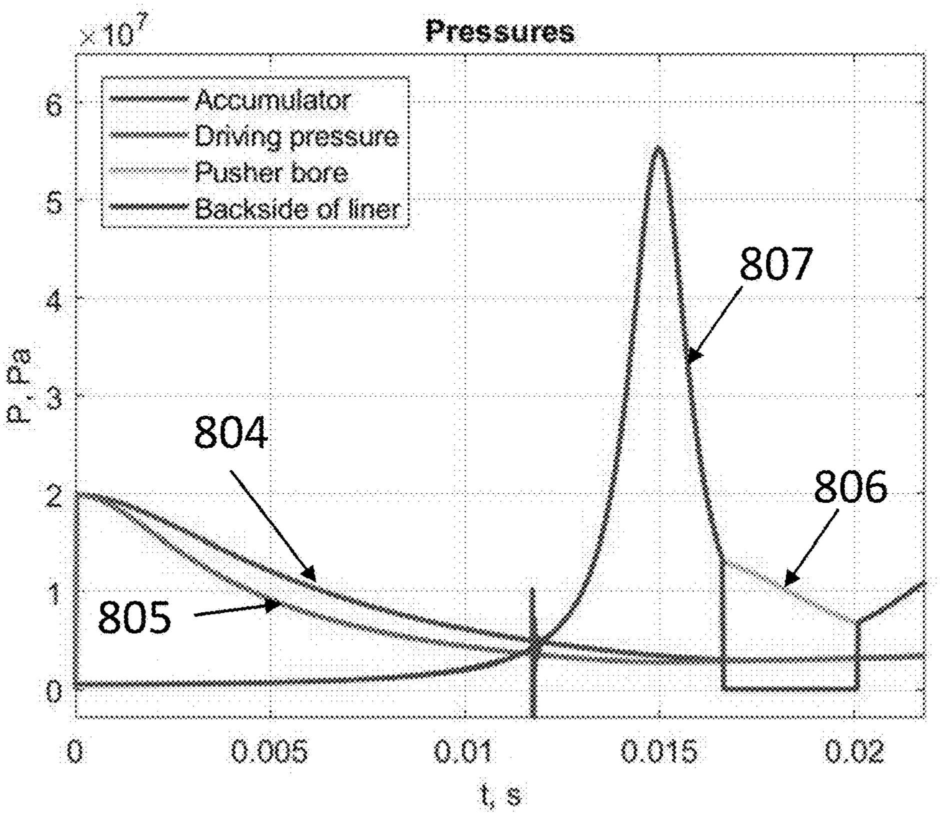
FIG. 9B is a graphical presentation of a pressure pulse over time at a driver bore and at a pusher bore on the backside of the liquid liner, during the compression operation.

FIG. 9A graphically illustrates the position trajectory over time of a driver piston (curve 801), a pusher piston (curve 802) and a liner inner interface (curve 803) over an exemplary compression operation. FIG. 8B illustrates a pressure pulse at an accumulator (curve 804), a driver bore (curve 805), a pusher bore (curve 806), and the back (outer surface) of the liquid liner (curve 807) during this compression operation. The compression drivers 5*a* are used to implode a liquid liner to collapse a cavity with radius of about 1.5 m that is formed within the liquid liner. As can be seen in the graph, the pusher piston and the liquid liner (see respective curves 802 and 803) accelerate only when the driver piston (curve 801) is near the pusher piston. Peak pressure at the end of the driver bore and beginning of the pusher bore (curve 805) and a peak pressure at the wall of the vessel (curve 806) occur at the same time, when the pusher piston is accelerated.

Figure 10A:
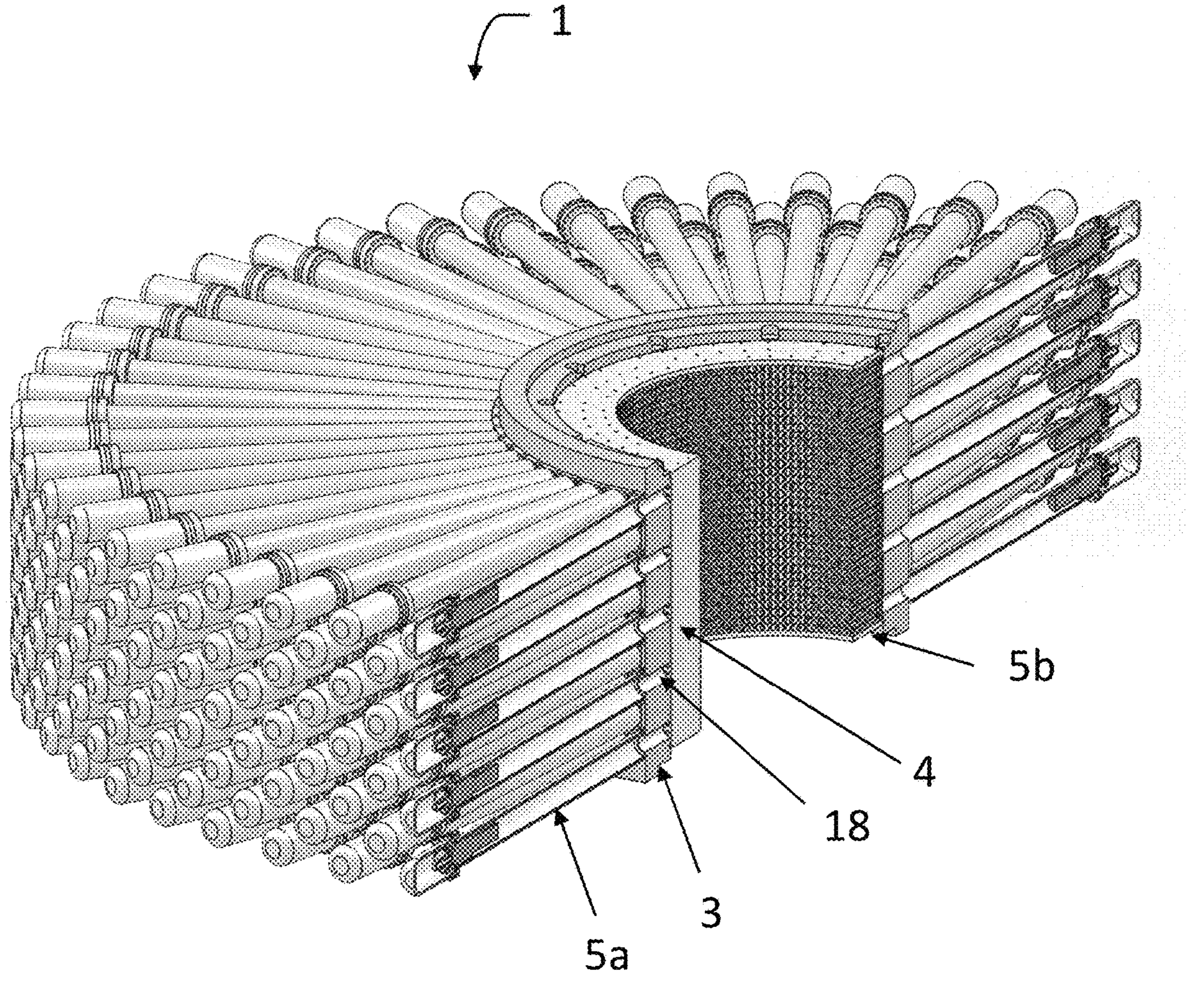
Figure 10B:
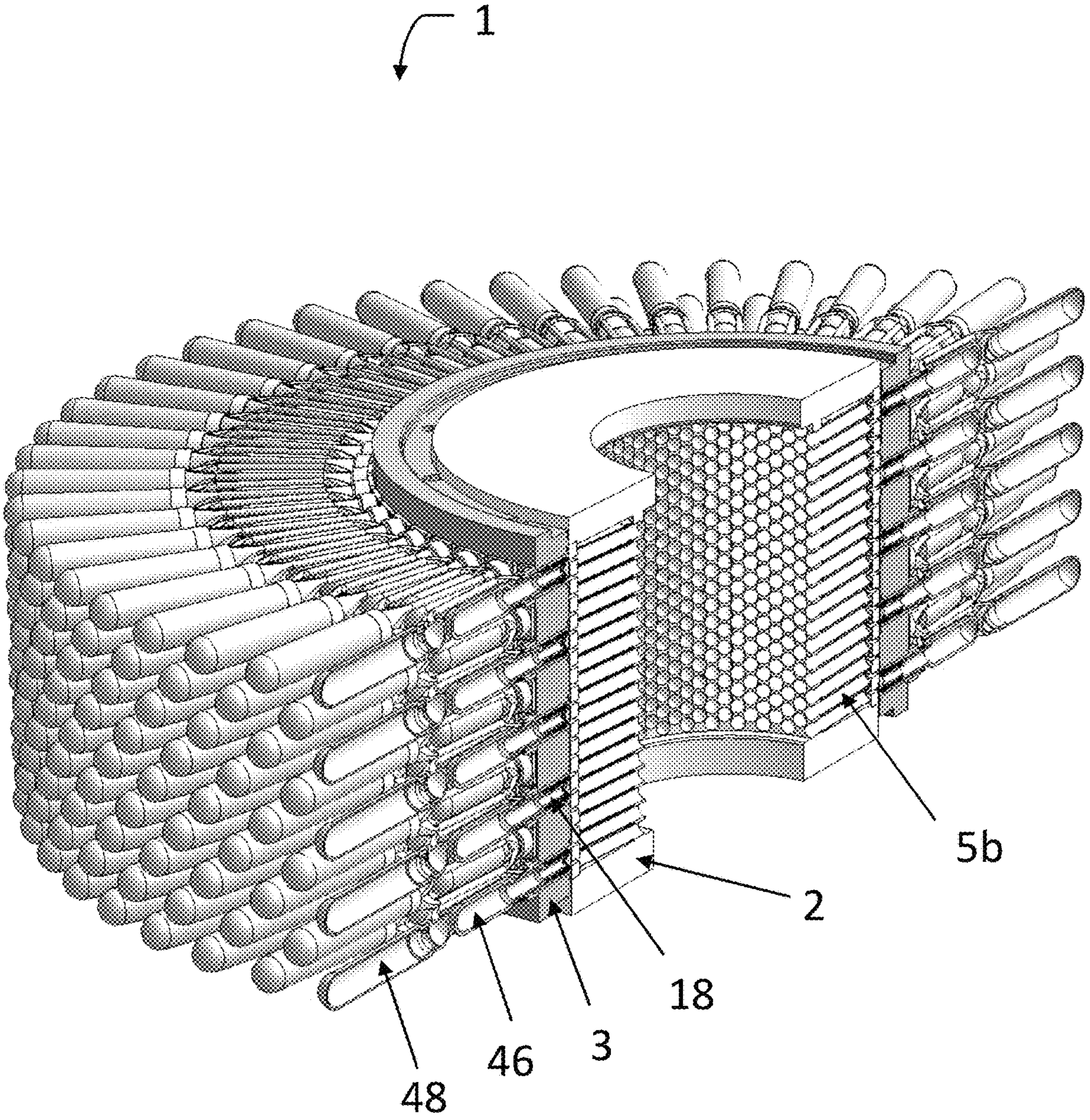
FIG. 10B shows the second embodiment of the compression drivers.

FIG. 10A illustrates a cutaway view of a portion of the plasma compression system 1, showing nine layers of compression drivers 5*a*, the vessel 3 and the rotating core 4. The vessel 3 contains a plurality of ports 12 into which the compression drivers 5*a* are attached.

Referring now to FIGS. 2B, 6A-D, 7B and 10B, and according to an alternative embodiment, the plasma compression system 1 comprises compression drivers 40 that use pressurized gas instead of driver pistons to deliver a pressure pulse into the annular gap 10. The compression driver 40 as shown in these Figures has a generally cylindrical valve housing 42 fixedly mounted at one end to an outer surface of the vessel wall 3, and contains a drive valve 44 that is in fluid communication with a vessel wall opening 3 and an accumulator 46. The accumulator 46 is a pressure vessel that contains a highly pressurized compression fluid. The initial and intermediate pressures of the compressible fluid in the accumulator 46 and the timing of the release of the compressible fluid through the drive valve 44 contribute to achieving the synchronized, shaped collapse of the liquid liner. In one embodiment, the pressure of the compression fluid can be fine-tuned prior to the compression shot by using a heating element 53 disposed within the accumulator 46 to heat the compression fluid. In another implementation, the pressure of the compression fluid can be fine-tuned during the compression shot by heating the compression fluid by means of an electric arc generated across two electrodes 19 positioned within the accumulator 46. The compression fluid can be any fluid that can be compressed and can in one implementation be a gas, such as helium. In another implementation, the compression fluid can be a mixture of a gas and a saturated (dry) steam.

The drive valve 44 can be a conical seat shut off valve like the type disclosed in U.S. Pat. No. 8,336,849; however persons skilled in the art would appreciate that other suitable valve designs can also be used. The drive valve 44 is communicative with a controller which has a processor and a computer readable memory having encoded thereon instructions executable by the processor to open the drive valve 44 to discharge the accumulator gas into the annular gap in a compression operation.

A pressure relief tank 48 is provided to receive the compression fluid from the annular gap 10 after the pressure pulse has actuated the implosion drivers 5*a*. The pressure relief tank 48 is fluidly coupled to the vessel wall opening 3 by a compression fluid return conduit 50, which comprises an annular passage extending lengthwise between the vessel wall opening 3 and the accumulator pressure vessel 46, and multiple manifolds that extend lengthwise along the outside of the accumulator pressure vessel 46 to openings at the distal end of the pressure relief tank 48. A rebound valve 52 is located at the distal end of the compression fluid return conduit 50 and near the vessel wall opening 3, and is communicative with the controller which is programmed to open the rebound valve 52 to allow the relief tank 48 to receive the compression fluid at the end of the compression operation.

Figure 6A:
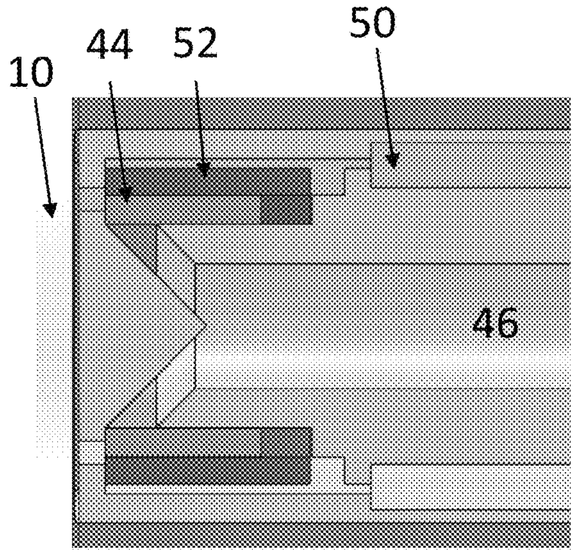
Figure 6B:
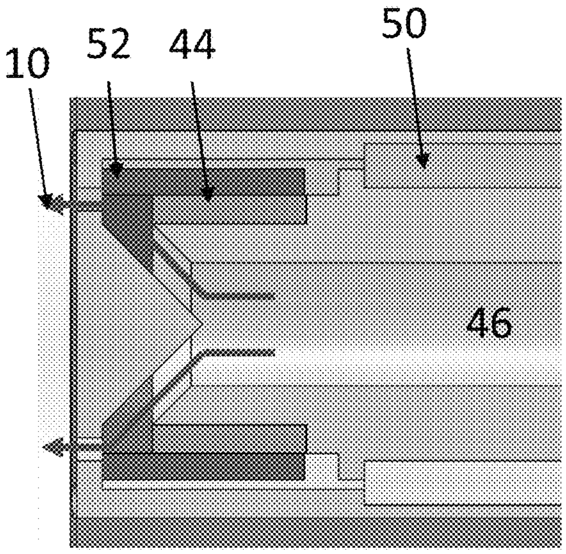
Figure 6C:
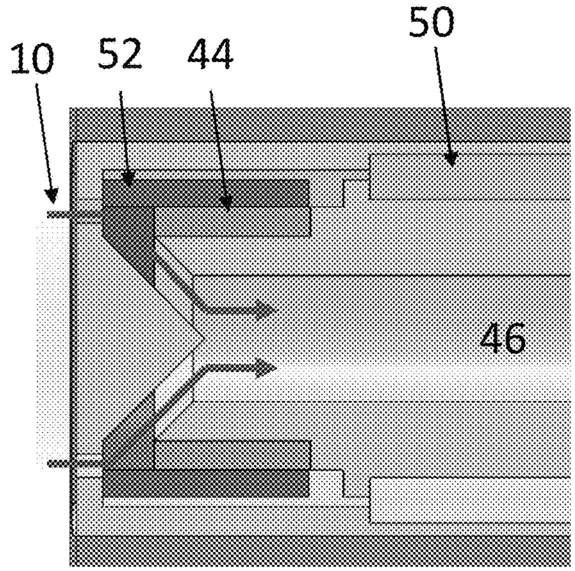
Figure 6D:
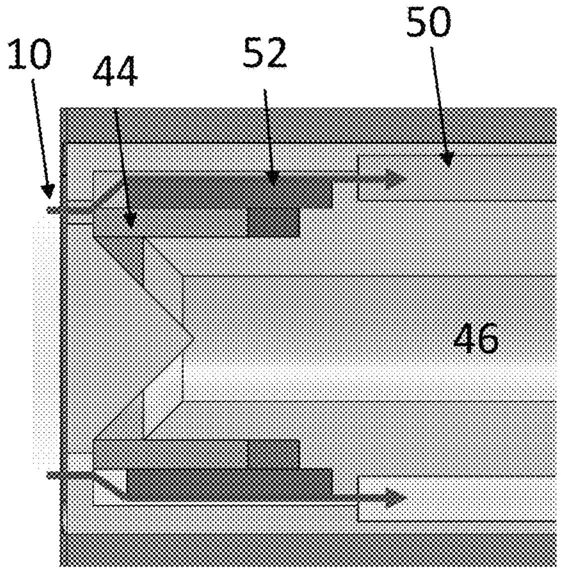

Referring to FIGS. 6A-6D, the controller controls the opening and closing of the drive valve 44 and rebound valve 52 over four phases of a compression shot. As shown in FIG. 6A and during a pre-shot phase, both the drive valve 44 and rebound valve 52 are closed and the accumulator pressure vessel 46 is filled with high pressure compression fluid. As shown in FIG. 6B, and during a compression phase, the controller opens the drive valve 44 and the accumulator gas is discharged directly into the annular gap 10, as shown by the arrows. This creates a rapid pulse of pressure in the annular gap 10 and provides the motive force to accelerate the pusher pistons 8 which in turn collapse the liquid liner and compress the plasma target. As shown in FIG. 6C, and during a rebound recovery phase, the controller keeps the drive valve 44 open and the rebound valve 52 closed, and the liquid liner rebounds and some of the compression fluid flows back into the accumulator pressure vessel 46 as shown by the arrows. As shown in FIG. 6D and during an energy dissipation phase, the controller closes the drive valve 44 and opens the rebound valve 52, and the rest of the compression fluid flows from the annular gap 10, past the rebound valve 52, through the compression fluid return conduit 50, and into the relief tank 48. This process brings the pressure in the annular gap 10 back down to a level which allows the rest of the plasma compression system to reset for the next compression shot, and serves to recapture a portion of the energy returned by the rebound of the liquid line back into the rotating core and pusher bores. Once the pressures have equalized, the controller closes the rebound valve 52 to maintain system reset status and begins preparations for the next compression shot.

Alternatively (not shown), the opening and closing of the valves during the four phases of the compression shot can be provided by a mechanical system instead of the controller. The mechanical system comprises mechanical timing devices known in the art, such as a spring-actuated poppet.

In the illustrated embodiment, each compression driver 40 comprises its own accumulator 46; however in alternative embodiments, multiple compression drivers 50 can share a single accumulator, for example, one accumulator can be provided for each layer of compression drivers 40 (not shown), or a single accumulator can be provided for all the compression drivers 40 (not shown).

Referring again to FIG. 1, the external poloidal field coils 6 are placed around the periphery of the containment vessel 3. In the illustrated embodiment, two substantially ring-shaped coils 6 are positioned respectively above and below the rotating core 4, substantially symmetrically around and substantially perpendicularly to the longitudinal rotation axis. That is, a first coil and a second coil are spaced from and substantially parallel to the first coil, with the plasma compression region between the first and second coils.

The poloidal field generator is electrically coupled to and supplies an electrical current to the poloidal field coils 6 to externally generate a poloidal magnetic field. In some embodiments, the poloidal field generator can be configured to flow a substantially constant electric current through the poloidal filed coils 6 while the liquid medium compresses the plasma. More particularly, the poloidal field generator can be configured to supply a substantially constant electric current over a lifetime of the plasma within the plasma compression region. In some embodiments, the poloidal field generator can be configured to supply an electric current with an alternating current (AC) component and a direct current component (DC), wherein the AC component has a frequency that is less than 10 Hz and a magnitude less than 10% of a magnitude of the DC component of the electric current.

In some embodiments, the vessel wall 3 has an inner radius in a range of 3.5 m to 5.5 m along a direction substantially perpendicular to the wall. In some embodiments, the rotating core 4 has an inner radius in a range of 1.5 m to 3 m along the direction substantially perpendicular to the vessel wall 3.

In operation, the plasma injector 2 injects a magnetized toroidal plasma into the plasma compression region for compression by the plasma compression system 1. The plasma compression region is at least partially bounded by the metallic liquid liner rotating around a symmetry axis of the plasma. The poloidal field generator flows electrical current through the plurality of poloidal field coils 6 to externally generate a poloidal magnetic field by generating a magnetic flux within the liquid liner and the plasma compression region, such that at least some of the magnetic flux in the plasma compression region extends along the symmetry axis. As noted above, the electric current from the poloidal field generator can be substantially constant, and as the liquid liner is compressed, at least some of the magnetic flux moves within the liquid liner towards the longitudinal rotation axis.

The drivers 5*a*, 5*b* compresses the liquid liner towards the longitudinal rotation axis thereby reducing a volume of the plasma compression region containing the plasma and compressing the plasma. Compressing the liquid liner comprises adjusting a trajectory of the liquid liner to dynamically adjust the magnetic flux within the plasma compression region To utilize a flux conserver comprising a thick flowing liquid metal cavity, surrounding mechanical compression drivers 5*a* are used to create a pressure pulse to rapidly collapse the cavity and compress the plasma target. Creating and applying an externally-generated poloidal magnetic field to help sustain the plasma in this configuration can be challenging for at least three reasons. First, the ideal position for the external poloidal field coils 6 generating the external poloidal field is near the equator of the reaction vessel 3, which would interfere with the compression drivers 5*a* used to propel the liquid liner compression into collapse. Second, even if the poloidal field coils 6 could be engineered to fit in the available space near the equator outside the reaction vessel 3, the resulting externally generated poloidal magnetic field must penetrate through the vessel walls 3 as well as through the thick liquid metal vortex to affect the plasma confinement. Third, the strength of the reaction vessel 3 is achieved with ferromagnetic steel walls, and the magnetic properties of steel tend to prevent the magnetic field from penetrating through the vessel wall 3. Certain embodiments described herein advantageously avoid the interferences that equatorial coils would have with the compression drivers 5*a*. In addition, instead of shielding the plasma from the externally-generated magnetic field, certain embodiments advantageously utilize the ferromagnetic vessel walls 3 to assist in directing the externally-generated magnetic flux to the plasma. Also, certain embodiments advantageously utilize the collapsing liquid liner to "drag" the poloidal magnetic field along with the liquid liner during the compression. Certain embodiments described herein achieve plasma confinement for sufficiently long time periods to allow mechanical compression of the plasma by achieving the benefits of an externally-generated poloidal field, while retaining the thick flowing liquid metal and compression capability for the plasma compression system 1.

In one embodiment, by positioning the external poloidal field coils 6 at the top and bottom of the reaction vessel 3, rather than at the equator, interference with the compression drivers 5*a* is resolved. If a ferromagnetic vessel 3 is used, with proper design consideration given to magneto-hydrodynamic configuration, rather than excluding the poloidal magnetic fields generated by the external poloidal field coils 6, the vessel 3 itself acts as a "magnetic yoke" and distributes the field inside the vessel (3 in a near-optimal configuration. The ferromagnetic steel of the vessel 3 acts as a magnetic yoke that has the desirable property that the poloidal magnetic field is guided to spread more uniformly along the liquid metal than the external poloidal field coils would allow on their own. With this poloidal coil design, placement, and control, not only is the externally generated poloidal magnetic field introduced through the ferromagnetic vessel wall 3 and into the liquid metal flux conserver, but certain benefits arise from the control of the poloidal magnetic fields prior to the rapid movement of the liquid metal flux conserver during compression, such as the benefit of pre-forming a distributed uniform magnetic flux within the liquid liner that is then retained during compression, thus reducing thermal and magnetic flux diffusion into the metal liner as implosion proceeds.

Experimental Embodiment

FIG. 11 shows an experimental plasma system 100 which was tested to model the behavior of magnetized plasma within a liquid metal flux conserver in an MTF reactor. The experimental system 100 comprised a plasma injector 2 and a flux conserver comprising poloidal field coils 6, a solid metal central conductor 7 and a plasma containment vessel 3. The elements of the experimental system 100 were configured to model confinement of a magnetized plasma by a plasma compression system 1 having a liquid metal liner.

For the experiments, the system 100 was connected to a current pulse power source (not shown) to provide a formation current pulse and a toroidal field sustainment current pulse to the central conductor 7 to form a magnetized plasma in the plasma injector 2. The vessel 3 received magnetized plasma from the plasma injector 2. The curvature of the vessel walls simulated a curved imploding liquid liner during a plasma compression operation.

Figure 12A:
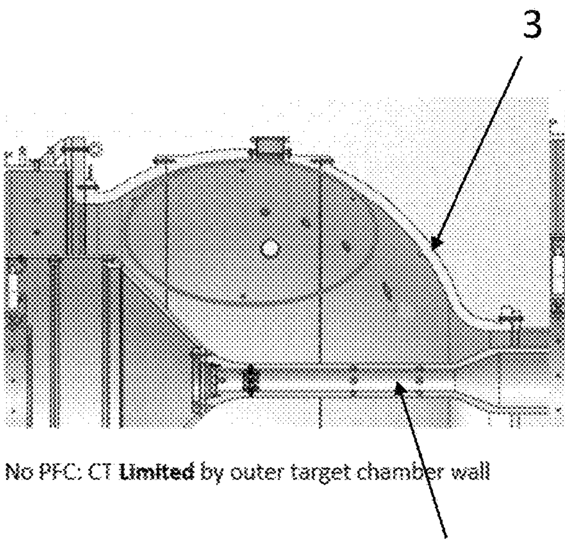
Figure 12B:
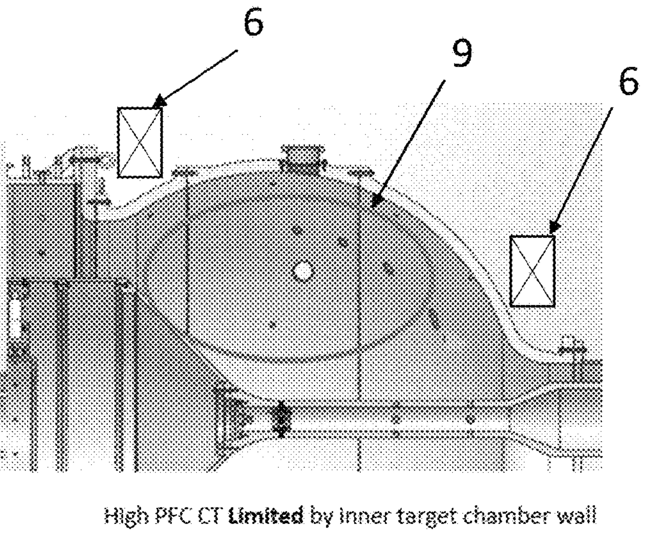
Figure 12C:
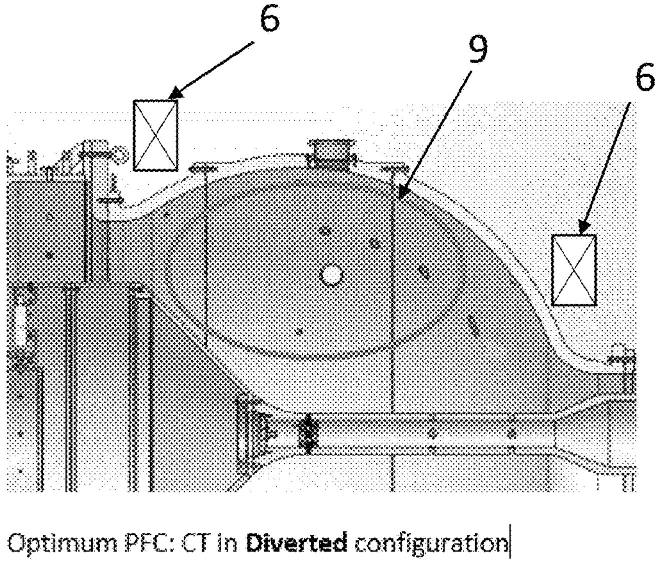
Figure 13A:
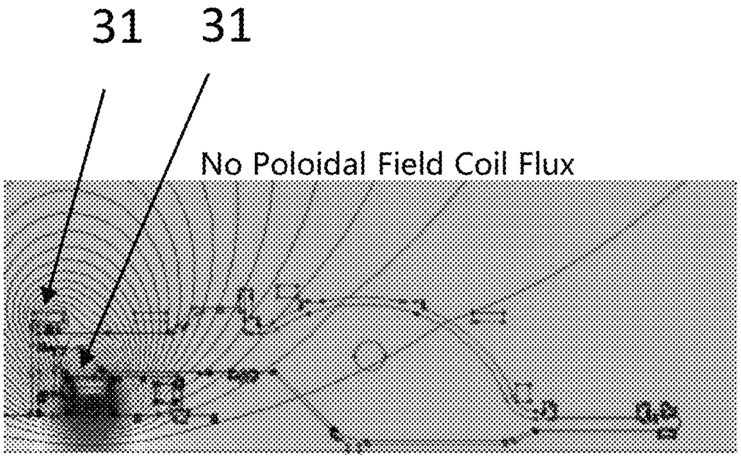
FIG. 13A is a horizontal cross-sectional half side views of the plasma injector and flux conserver showing a magnetic flux configuration map where the poloidal field coils are not energized and no external poloidal field is present.
Figure 13B:
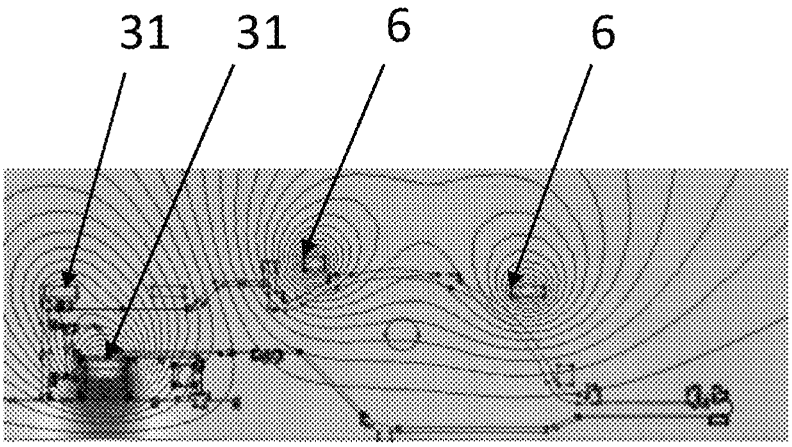
FIG. 13B is a horizontal cross-sectional half side views of the plasma injector and flux conserver showing a magnetic flux configuration map where the external poloidal field coils are energized and an external poloidal field is present.
Figure 14:
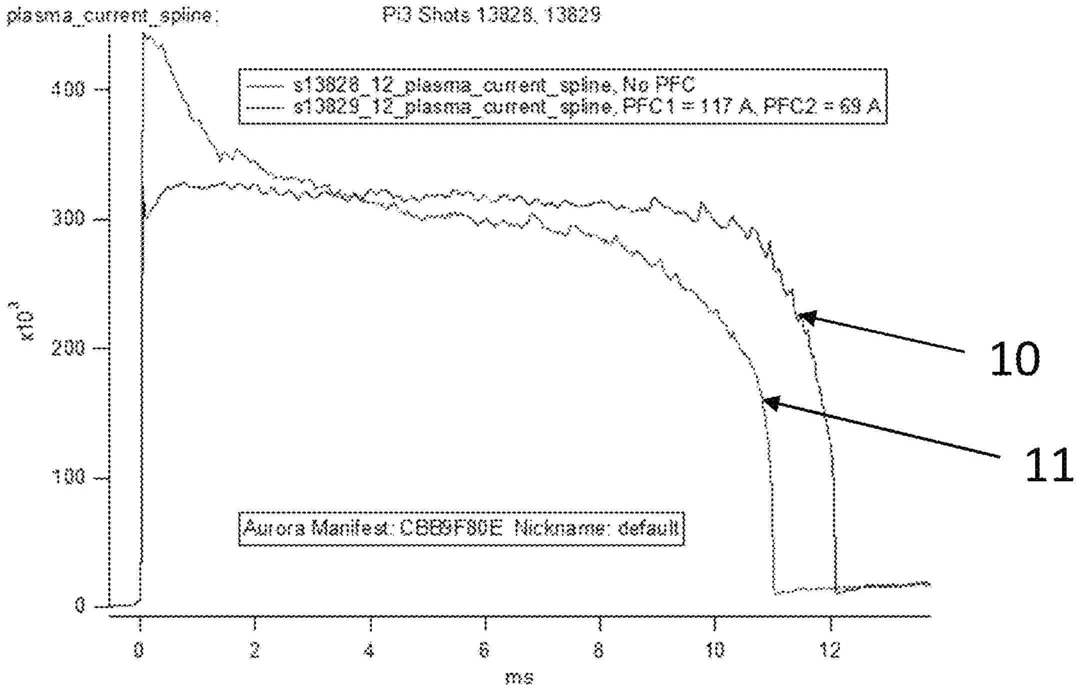
FIG. 14 is a graph showing a single experimental result from the experimental system of plasma lifetime versus plasma current under conditions of a poloidal field present, and no poloidal field present.

In a first experiment as shown in FIG. 13A, the magnetized plasma was injected into the flux conserver having a magnetic flux configuration generated by only the formation current pulse and toroidal field sustainment current pulse from the formation field coils 31, i.e. without energizing the poloidal field coils 6. FIGS. 12A and 12B show the expected positions of the plasma 9 (outer surface of the plasma shown in red line) under these conditions, wherein the plasma 9 disadvantageously contacts the vessel wall 3 (FIG. 12A) or the central conductor 7 (FIG. 12B). In a second experiment as shown in FIG. 13B, the magnetized plasma 9 was injected into the flux conserver having a magnetic flux configuration generated by the formation current pulse and toroidal field sustainment current pulse from the formation field coils 31 and modified by an externally generated poloidal magnetic field from energized poloidal field coils 6. FIG. 12C shows the expected position of the plasma 9 under these conditions, wherein the plasma 9 is ideally positioned away from the vessel wall 3 and central conductor 7. FIG. 14 shows the plasma lifetime of the plasma in the flux conserver when the poloidal field coils 6 were energized (second experiment, plot line 10) and not energized (first experiment, plot line 11); it can be seen from this Figure that the plasma lifetime improved by use of external poloidal field coils 6.

Figure 15:
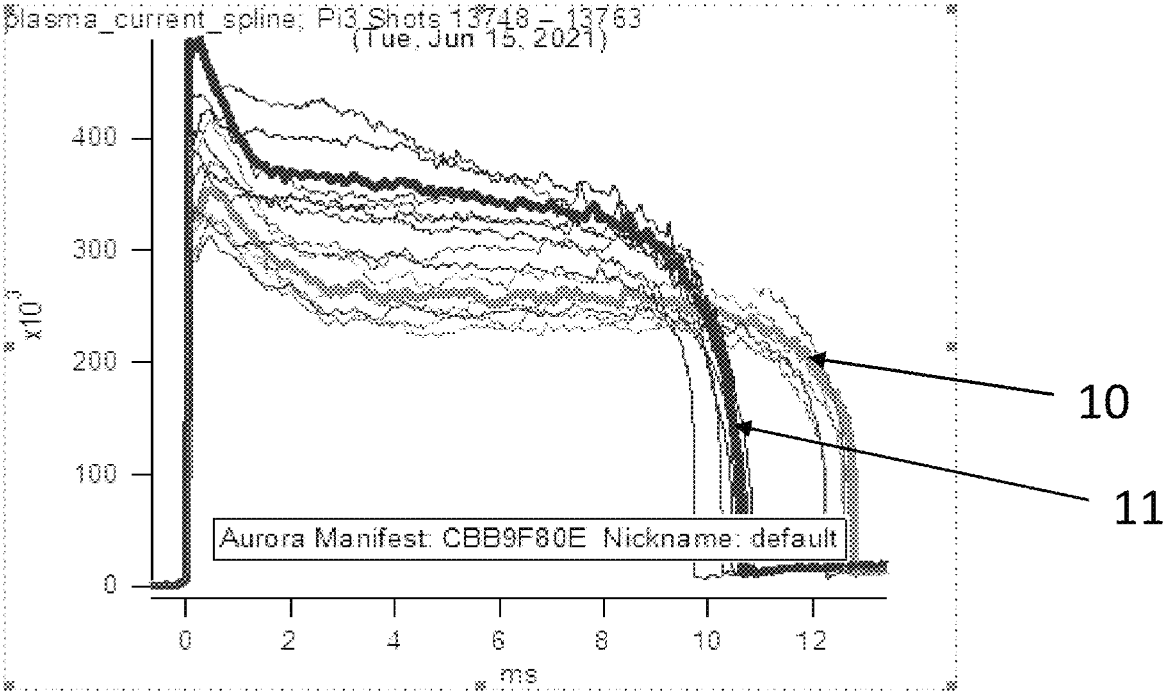
FIG. 15 is a graph showing a series of experimental results from the experimental system, of plasma lifetime versus plasma current under conditions of a poloidal field present, and no poloidal field present.

As shown in FIG. 15, the first and second experiments were repeated multiple times. Through the gathering of data from multiple tests of the experimental system 100, it is expected that the behavior of the magnetized plasma 9 under the influence of poloidal fields can be accurately modelled for a plasma compression system having a liquid metal liner, including but not limited to the rotating core plasma compression system 1.

The experiments confirmed that prior to compression, an externally generated poloidal magnetic field can be generated by the poloidal field coils 6 positioned above and below the reaction vessel 3, and through manipulation of the operation of the poloidal field coils 6, the externally generated poloidal magnetic field can be introduced into both the vacuum region where the plasma will be positioned, and in the rotating liquid metal liner flux conserver. The external poloidal field is said to be 'soaked' in the liquid metal liner, in that the external poloidal field exists in the liquid metal and will tend to stay pinned to, or in the liquid metal. Pre-compression control measures may include factors such as poloidal coil current, soak duration prior to the initial plasma formation, and relative current and soak duration among the two or more poloidal coils. Before and during plasma compression, the plasma introduced into the cavity is buffered (held away) from the liquid metal wall by the externally generated poloidal field. This buffer prevents the plasma's magnetic field from soaking into the liquid metal wall, which would disadvantageously cool the plasma, making fusion conditions more difficult to achieve.

During compression the externally generated poloidal field is pushed radially inwards and is shaped by the inwardly collapsing liquid metal wall, such that deliberate and dynamic shaping of the liquid metal wall allows deliberate and dynamic shaping of the externally generated poloidal field. One embodiment to achieve this shaping is described above with reference to the embodiment shown in FIGS. 1-10, and other embodiments are disclosed in International application numbers PCT/CA2021/051824 and PCT/CA2021/051825, which are hereby incorporated by reference in their entirety. The buffer region created by the externally generated poloidal magnetic field is shaped by the mechanically driven liquid metal liner to both maximize plasma compression and to prevent the plasma's magnetic field from diffusing into the liquid metal liner. Reducing diffusion has the benefit of longer lifetime of the magnetized plasma, improving conditions under which a fusion reaction to occur and reducing machine design stress constraints.

In some circumstances, a liquid metal compression can interpose meters of liquid metal between the plasma and the vessel wall 3. Under these circumstances, it was expected that the poloidal field coils 6 would not exert a poloidal magnetic field with any appreciable effect to isolate the plasma from the vessel wall 3. It was expected that only the flux conserver could achieve a barrier between plasma and vessel wall 3. Surprisingly, the experiments revealed that creating an externally generated poloidal magnetic field during the pre-compression stage and allowing the externally generated poloidal magnetic field to diffuse into the liquid metal liner to a near-DC state, that this external poloidal field remains "frozen into" the liquid metal, and follows the liquid metal deep into compression, exerting a significant and beneficial buffering effect between the plasma and the collapsing liquid metal liner wall.

The 'dragging' of embedded poloidal magnetic flux by the liquid metal during compression is a consequence of magnetohydrodynamics (MHD) design and control, occurring in situations where the compression time scale is short compared to the time required for non-equilibrium currents to resistively decay. A key control parameter is the magnetic Reynolds number which is typically large in machines designed to compress plasma using liquid metal. This results in embedded poloidal magnetic flux being carried along with the liquid metal, preserving the buffer layer between the metal and the plasma during compression.

The experiments also revealed that there is an optimum amount of externally generated poloidal magnetic field beyond which there are diminished benefits to plasma heating and lifetime. The conductive metal flux conserver plays a role in stabilizing the magnetically confined plasma. Fast localized changes to the plasma magnetic configuration, like those that are a result of inherent magnetized plasma instabilities, inductively react with the liquid metal liner. These reactions provide restoring forces on the plasma and the localized magnetic perturbations. This stabilizing effect is diminished as the plasma is held away from the liquid metal liner by an externally generated poloidal magnetic field. This implies that there is an optimal practical amount of externally generated poloidal magnetic field: enough to keep the plasma off the liquid metal liner wall, reducing heat loss, but not so much as to move the plasma so far from the liquid metal liner wall that the plasma does not benefit from the stabilizing effect of the proximal liquid metal solid metal wall.

The experiments revealed that confinement of a magnetized plasma by a liquid flux conserver only may be sub-optimal, because A) the plasma interacts significantly with the wall since the repulsion mechanism does not keep the plasma far enough away to prevent energetic particles from contacting the wall and B) the fields from the plasma resistively diffuse into the wall, such that the plasma "falls" into the wall progressively over time. These issues may be significant even in a "static" non-compressing regime where the wall of the flux conserver is fixed but may become more significant under dynamic liquid liner compression where the flux conserver itself moves inward toward the plasma.

Figure 16:
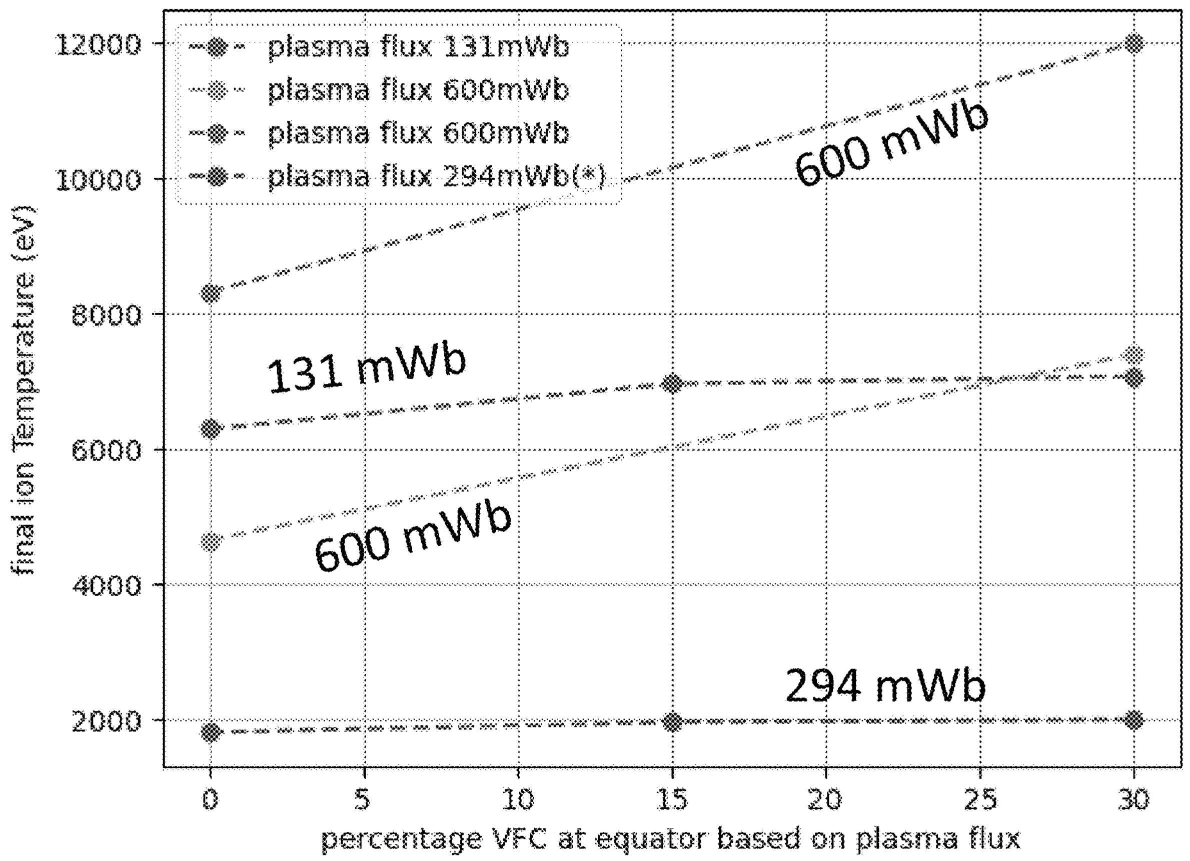
FIG. 16 is a graph of modeled data based on the experimental system, showing that improvements in plasma temperature follow poloidal flux fraction, up to 30% flux fraction.
Figures 17A, 17B:
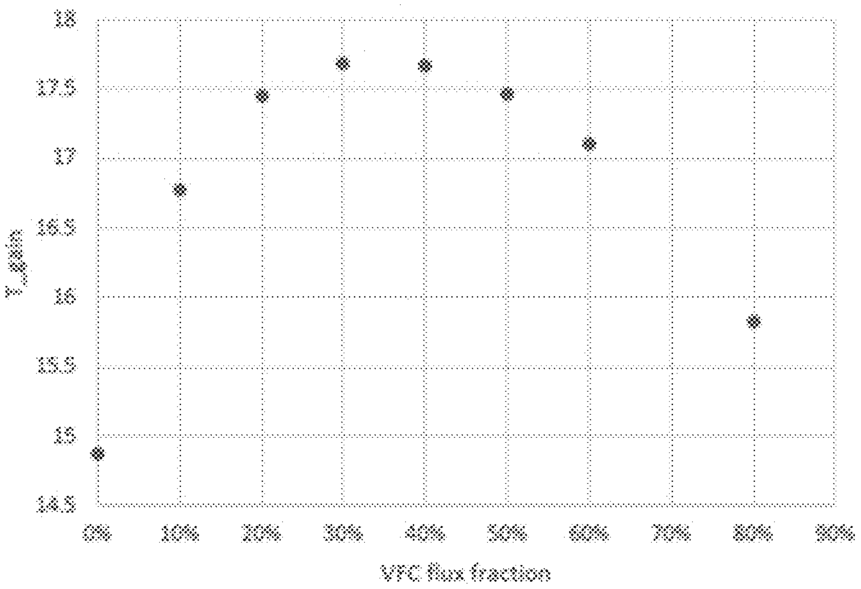
FIGS. 17A and 17B are a graph and a table respectively showing simulated results from the experimental system, of plasma temperature gain versus the percent of poloidal flux applied to the plasma.

Optimum poloidal field coil (PFC) control parameters were determined using validated simulation models for predicting plasma heating and lifetimes during compression in the plasma compression system 1. FIG. 16 shows that use of the poloidal field coils 6 yielded improvements in final plasma temperature during compression, in a proportionate relationship up to the study limits of 30% flux fraction. However, further findings demonstrate that above 40% flux fraction, the final plasma temperature reduces. Therefore, the experiments with the plasma injector 2 and using validated modeling, there was found an optimum poloidal flux fraction that results in the highest plasma temperatures. FIG. 17A shows that simply increasing the poloidal flux fraction does not produce optimum plasma temperature gain beyond about 40% flux fraction, and careful control over the ratio of PFC flux to plasma flux yields an optimum plasma temperature gain during plasma compression at 30%-40% PFC flux fraction. Control over the PFC flux fraction is achieved by control over PFC coil current, voltage, soak duration, and relative magnetic flux strength among the two or more external poloidal field coils 6. Another control parameter is the relative strength of the PFC flux fraction, defined as (PFC flux)/(plasma flux). FIG. 17B is a table of modelled results showing the effect on plasma temperature gain achieved during compression where the PFC flux fraction is controlled at 30%-40% PFC flux fraction.

Figure 18A:
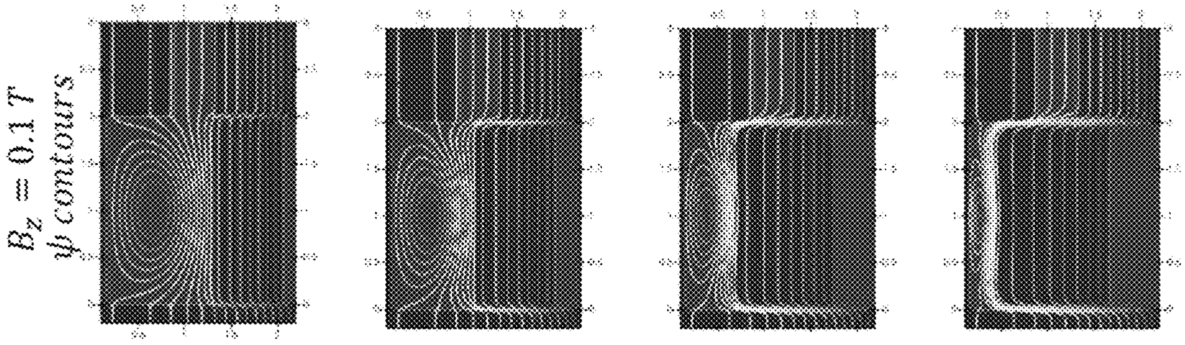
FIG. 18A is a simulated mapping of magnetic flux lines over time within the liquid metal liner during compression of the plasma based on the experimental system, where the liquid metal liner is uniformly imploded in a cylindrical shape.
Figure 18B:
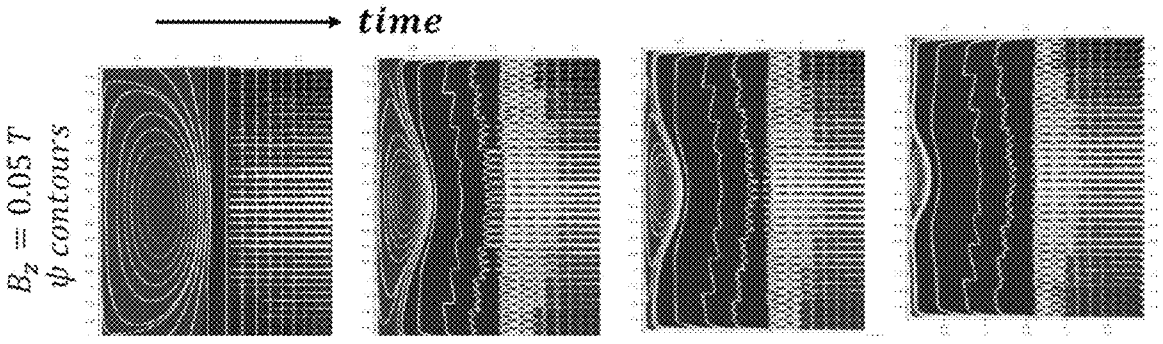
FIG. 18B is a simulated mapping of magnetic flux lines over time within the liquid metal liner during compression of the plasma based on the experimental system, where the liquid metal liner is spherically imploded.

Ultimately, the use of validated magnetic flux modelling for the plasma compression system 1 shows that the poloidal flux remains embedded in the liquid metal liner as it travels inward towards the plasma and center conductor 7. An important aspect of using poloidal field coils 6 in the presence of mechanically compressed liquid liners is that the externally generated poloidal magnetic field generated by the poloidal field coils 6 in the vacuum (not the liner) is compressed by the liquid liner during liner implosion. This is important because the increasing poloidal flux density, originally from the poloidal field coils 6, then tracks the compressing poloidal flux density from the target plasma. The resulting field equilibrium is necessary to prevent the increasing target plasma flux density from diffusing into the liquid liner. FIG. 18A shows a time series of liner implosion and magnetic flux lines, modelled for a cylindrical-shaped implosion. Note that the magnetic field lines in the vacuum cavity and the liquid liner remain organized throughout compression. The soaked flux density (in the liner) also tends to decrease during compression as the wall thickens during implosion. However, this shaped collapse profile is not useful for effective MTF plasma compression, which requires a spherical compression shape, as is known in the art. FIG. 18B shows a time series of a shaped liner implosion and magnetic flux lines, modelled for a spherically shaped implosion. Note that the magnetic field lines remain embedded throughout compression and the soaked flux density also tends to decrease during compression as the wall thickens via implosion. However, in the case of the spherically shaped liner compression, the magnetic field lines follow the non-linear (e.g. spherical) liner shape throughout its inward trajectory. Therefore, it is expected that a poloidal magnetic field when pre-soaked into the vacuum cavity can be controlled in shape and compression by dynamically controlling the shape created in the liquid liner during MTF mechanical compression.

While particular elements, embodiments and applications of the present disclosure have been shown and described, it will be understood, that the scope of the disclosure is not limited thereto, since modifications can be made without departing from the scope of the present disclosure, particularly in light of the foregoing teachings. Thus, for example, in any method or process disclosed herein, the acts or operations making up the method/process may be performed in any suitable sequence and are not necessarily limited to any particular disclosed sequence. Elements and components can be configured or arranged differently, combined, and/or eliminated in various embodiments. The various features and processes described above may be used independently of one another, or may be combined in various ways. All possible combinations and sub-combinations are intended to fall within the scope of this disclosure. Reference throughout this disclosure to "some embodiments," "an embodiment," or the like, means that a particular feature, structure, step, process, or characteristic described in connection with the embodiment is included in at least one embodiment. Thus, appearances of the phrases "in some embodiments," "in an embodiment," or the like, throughout this disclosure are not necessarily all referring to the same embodiment and may refer to one or more of the same or different embodiments. Indeed, the novel methods and systems described herein may be embodied in a variety of other forms; furthermore, various omissions, additions, substitutions, equivalents, rearrangements, and changes in the form of the embodiments described herein may be made without departing from the spirit of the inventions described herein.

Various aspects and advantages of the embodiments have been described where appropriate. It is to be understood that not necessarily all such aspects or advantages may be achieved in accordance with any particular embodiment. Thus, for example, it should be recognized that the various embodiments may be carried out in a manner that achieves or optimizes one advantage or group of advantages as taught herein without necessarily achieving other aspects or advantages as may be taught or suggested herein.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without operator input or prompting, whether these features, elements and/or steps are included or are to be performed in any particular embodiment. No single feature or group of features is required for or indispensable to any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

The example calculations, simulations, results, graphs, values, and parameters of the embodiments described herein are intended to illustrate and not to limit the disclosed embodiments. Other embodiments can be configured and/or operated differently than the illustrative examples described herein. Indeed, the novel methods and apparatus described herein may be embodied in a variety of other forms; furthermore, various omissions, substitutions and changes in the form of the methods and systems described herein may be made without departing from the spirit of the inventions disclosed herein.

What is claimed is:

1. A plasma compression system comprising:

a vessel configured to receive and contain a plasma and a metallic liquid medium circulating around a longitudinal rotation axis so as to at least partially bound a plasma compression region configured to receive and contain the plasma;

a plurality of drivers configured to controllably reduce a volume of the plasma compression region by inwardly moving the liquid medium towards the longitudinal rotation axis, the liquid medium compressing the plasma; and a plurality of electrically conductive coils outside the plasma compression region and configured to generate a poloidal magnetic field in the vessel, the liquid medium, and the plasma compression region, at least some of the poloidal magnetic field within the plasma compression region extending along the longitudinal rotation axis, and at least some of the poloidal magnetic field in the liquid medium moving inwardly towards the longitudinal rotation axis with the liquid medium as the liquid medium moves towards the longitudinal rotation axis.

2. The plasma compression system of claim 1, wherein the vessel comprises a ferromagnetic or ferrimagnetic material.

3. The plasma compression system of claim 2, wherein the plurality of electrically conductive coils are positioned relative to a wall of the vessel such that the vessel wall concentrates the poloidal magnetic field in the plasma compression region.

4. The plasma compression system of claim 1, wherein the plurality of electrically conductive coils comprises at least two substantially ring-shaped coils positioned substantially symmetrically around and substantially perpendicularly to the longitudinal rotation axis, the at least two substantially ring-shaped coils at different corresponding locations along the longitudinal rotation axis.

5. The plasma compression system of claim 1, wherein the plurality of electrically conductive coils comprises at least a first coil and a second coil spaced from and substantially parallel to the first coil, wherein the plasma compression region is between the first and second coils.

6. The plasma compression system of claim 1, wherein the vessel comprises wall portions having an inner radius in a range of 3.5 m to 5.5 m along a direction substantially perpendicular to the wall portions.

7. The plasma compression system of claim 6, further comprising a metallic rotating core inside the vessel, the rotating core configured to rotate about the longitudinal rotation axis, and at least portions of the rotating core having an inner radius in a range of 1.5 m to 3 m along the direction substantially perpendicular to the wall portions.

8. The plasma compression system of claim 1, further comprising a first electrical power source configured to flow substantially constant electric current in the plurality of electrically conductive coils while the liquid medium compresses the plasma.

9. The plasma compression system of claim 8, wherein the first electrical power source is configured to flow the electric current with an AC component and a DC component, wherein the AC component has a frequency that is less than 10 Hz and a magnitude less than 10% of a magnitude of the DC component.

10. The plasma compression system of claim 8, wherein the electrical power source is configured to flow a substantially constant electric current over a lifetime of the plasma within the plasma compression region.

11. The plasma compression system of claim 1, wherein a second electrical power source is coupled to a plurality of formation field coils and is configured to generate a formation magnetic field at the centerline (equatorial plane) of the vessel cavity in a range of 100 mWb to 700 mWb within the plasma compression region.

12. The plasma compression system of claim 1, wherein the plurality of drivers comprises a plurality of mechanical drivers.

13. The plasma compression system of claim 1, wherein the plurality of drivers comprises acoustic waves impinging upon the liquid medium.

14. The plasma compression system of claim 1, wherein the plurality of drivers comprises explosive gas or compressed gas applying a force to move the liquid medium.

15. A plasma compression system comprising:

a metallic vessel configured to receive and contain a plasma;

a metallic liquid liner in the vessel and at least partially bounding a plasma compression region having a longitudinal axis;

a plurality of drivers configured to move the liquid liner inwardly towards the longitudinal axis to compress the plasma in the plasma compression region; and a plurality of electrically conductive coils outside the plasma compression region and configured to generate a poloidal magnetic field in the liquid liner and the plasma compression region, at least some of the poloidal magnetic field within the plasma compression region extending along the longitudinal axis, and at least some of the poloidal magnetic field in the liquid liner moving inwardly towards the longitudinal axis with the liquid liner as the liquid liner moves towards the longitudinal axis.

16. The plasma compression system of claim 15, wherein the vessel is ferromagnetic or ferrimagnetic.

17. The plasma compression system of claim 15, wherein the plurality of electrically conductive coils are positioned relative to a wall of the vessel such that the vessel wall at least partially concentrates the poloidal magnetic field within the plasma compression region.

18. The plasma compression system of claim 15, wherein the plasma is substantially toroidal and substantially symmetric about the longitudinal axis, at least some of the poloidal magnetic field in the plasma compression region extending along a poloidal direction relative to the substantially toroidal plasma.

19. The plasma compression system of claim 15, further comprising a first electrical power source coupled to the electrically conductive coils and configured to generate the poloidal magnetic field within the plasma compression region with a strength sufficient to inhibit the plasma from impinging the liquid liner.

20. The plasma compression system of claim 15, wherein the plurality of electrically conductive coils comprises at least two substantially ring-shaped coils positioned substantially symmetrically around and substantially perpendicularly to the longitudinal axis, the at least two substantially ring-shaped coils at different corresponding locations along the longitudinal axis.

21. The plasma compression system of claim 15, further comprising a rotating core and a liquid medium in the vessel, the rotating core configured to rotate and circulate the liquid medium to form the liquid liner and the plasma compression region.

22. The plasma compression system of claim 21, wherein the rotating core has an outer surface that is spaced from an inner surface of the vessel by a gap, and the plurality of drivers comprises a plurality of implosion drivers extending through the rotating core from the gap to the plasma compression region and containing at least some of the liquid medium.

23. The plasma compression system of claim 22, further comprising a pressurized fluid source in fluid communication with the plurality of implosion drivers, wherein the pressurized fluid source is configured to controllably apply pressurized gas to the plurality of implosion drivers, thereby causing the implosion drivers to apply pressure pulses to the liquid medium such that the liquid liner is pushed inwards to collapse the plasma compression region and compress the plasma within the plasma compression region.

24. The plasma compression system of claim 15, wherein the plurality of drivers further comprises:

a plurality of compression drivers fixedly mounted to an outer surface of the vessel, and in fluid communication with the plurality of implosion drivers;

a compression fluid in the gap and in fluid communication the compression drivers and implosion drivers; and a pressurized fluid source in fluid communication with the plurality of compression drivers, wherein the pressurized fluid source is configured to controllably apply pressurized gas to the plurality of compression drivers, thereby causing the compression drives to apply first pressure pulses via the compression fluid to the plurality of implosion drivers, and thereby causing the implosion drivers to apply second pressure pulses to the liquid medium such that the liquid liner is pushed inwards to collapse the plasma compression region and compress the plasma within the plasma compression region.

25. The plasma compression system of claim 15, further comprising a plasma injector in fluid communication with the vessel and configured to inject the plasma into the plasma compression region.

26. The plasma compression system of claim 15, wherein the plurality of drivers comprises at least one of: a plurality of mechanical drivers; acoustic waves impinging upon the liquid medium; explosive gas or compressed gas applying a force to move the liquid medium.

27. A method comprising:

injecting a magnetized toroidal plasma into a plasma compression region, the plasma compression region at least partially bounded by a metallic liquid liner having a longitudinal axis;

generating a poloidal magnetic field within the liquid liner and the plasma compression region, at least some of the poloidal magnetic field in the plasma compression region extending along the longitudinal axis; and moving the liquid liner towards the longitudinal axis thereby reducing a volume of the plasma compression region containing the plasma and compressing the plasma, at least some of the poloidal magnetic field in the liquid liner moving inwardly towards the longitudinal axis with the liquid liner as the liquid liner moves towards the longitudinal axis.

28. The method of claim 27, wherein said generating poloidal magnetic field comprises flowing electrical current through a plurality of coils external to the plasma compression region.

29. The method of claim 28, wherein, during said compressing, the electric current is substantially constant.

30. The method of claim 27, wherein said compressing the liquid liner comprises adjusting a trajectory of the liquid liner to dynamically adjust the poloidal magnetic field within the plasma compression region.

31. The method of claim 27, further comprising rotating a metallic liquid medium to form the metallic liquid liner, wherein the liquid liner rotates around a rotation axis symmetric with the longitudinal axis.

* * * * *